United States Patent
Stoica et al.

(10) Patent No.: US 10,474,736 B1
(45) Date of Patent: Nov. 12, 2019

(54) MULTIPLE DISPLAY VIEWS FOR A NOTEBOOK

(71) Applicant: Databricks Inc., San Francisco, CA (US)

(72) Inventors: Ion Stoica, Piedmont, CA (US); Ali Ghodsi, Berkeley, CA (US); Chaoyu Yang, San Francisco, CA (US)

(73) Assignee: Databricks Inc., San Francisco, CA (US)

( * ) Notice: Subject to any disclaimer, the term of this patent is extended or adjusted under 35 U.S.C. 154(b) by 167 days.

(21) Appl. No.: 14/979,253

(22) Filed: Dec. 22, 2015

(51) Int. Cl.
*G06F 17/21* (2006.01)
*G06F 17/24* (2006.01)
*G06F 17/22* (2006.01)
*G06F 3/0481* (2013.01)

(52) U.S. Cl.
CPC ........ *G06F 17/212* (2013.01); *G06F 3/04817* (2013.01); *G06F 17/22* (2013.01); *G06F 17/24* (2013.01)

(58) Field of Classification Search
CPC ......... G06F 17/212; G06F 17/22; G06F 17/24
See application file for complete search history.

(56) References Cited

PUBLICATIONS

Databricks, Databricks Cloud Announcement and Demo at Spark Summit 2014, a YouTube video found at https://www.youtube.com/watch?v=dJQ51V5TIdw, published on Jul. 2, 2014, transcript and captured images 52 pages.*

Databricks, Apache Spark on Databricks for Data Engineers (Scala) found at https://databricks-prod-cloudfront.cloud.databricks.com/public/ 4027ec902e239c93eaaa8714f173bcfc/346304/2168141618055109/484361/latest.html, Jun. 21, 2014, 22 pages.*

Databricks, Databricks Cloud Announcement and Demo at Spark Summit 2014, a YouTube™ video found at https://www.youtube.com/watch?v=dJQ51V5TIdw, published on Jul. 2, 2014, transcript and captured images total 55 pages (Year: 2014).*

Databricks, Databricks Cloud Announcement and Demo at Spark Summit 2014, a YouTube™ video found at https://www.youtube.com/watch?v=dJQ51V5TIdw, published on Jul. 2, 2014, transcript and captured images total 58 pages (Year: 2014).*

* cited by examiner

*Primary Examiner* — Scott T Baderman
*Assistant Examiner* — Seung Woon Jung
(74) *Attorney, Agent, or Firm* — Van Pelt, Yi & James LLP

(57) ABSTRACT

A system for multiple views for a notebook includes an input interface and a processor. The input interface to receive a notebook. The processor is to load the notebook into a shell, wherein the shell executes the notebook using a cluster, to receive an indication to view a dashboard associated with the notebook, and to provide dashboard display information. The dashboard includes a page layout display.

17 Claims, 42 Drawing Sheets

Pages (2 of 2) — 2760

Dashboard Page 2

Exit

FIG. 27G

```
3200 ─┐  getArgument("myArguments", "myValue")

myArguments: [myValue]

Out[2] : 'myValue'
       Command took 0.08s
```

FIG. 32

MULTIPLE DISPLAY VIEWS FOR A NOTEBOOK

BACKGROUND OF THE INVENTION

Large data sets need large computation resources in order to explore, analyze, and display the data sets. However, typically the tools for working with the large data sets are clunky and the large computation resources (e.g., a cluster) are difficult to setup and use.

BRIEF DESCRIPTION OF THE DRAWINGS

Various embodiments of the invention are disclosed in the following detailed description and the accompanying drawings.

FIG. 27G is diagram illustrating an embodiment of a presentation view.

FIG. 32 is a diagram illustrating an embodiment of a code section comprising an input element.

DETAILED DESCRIPTION

Figure 1:
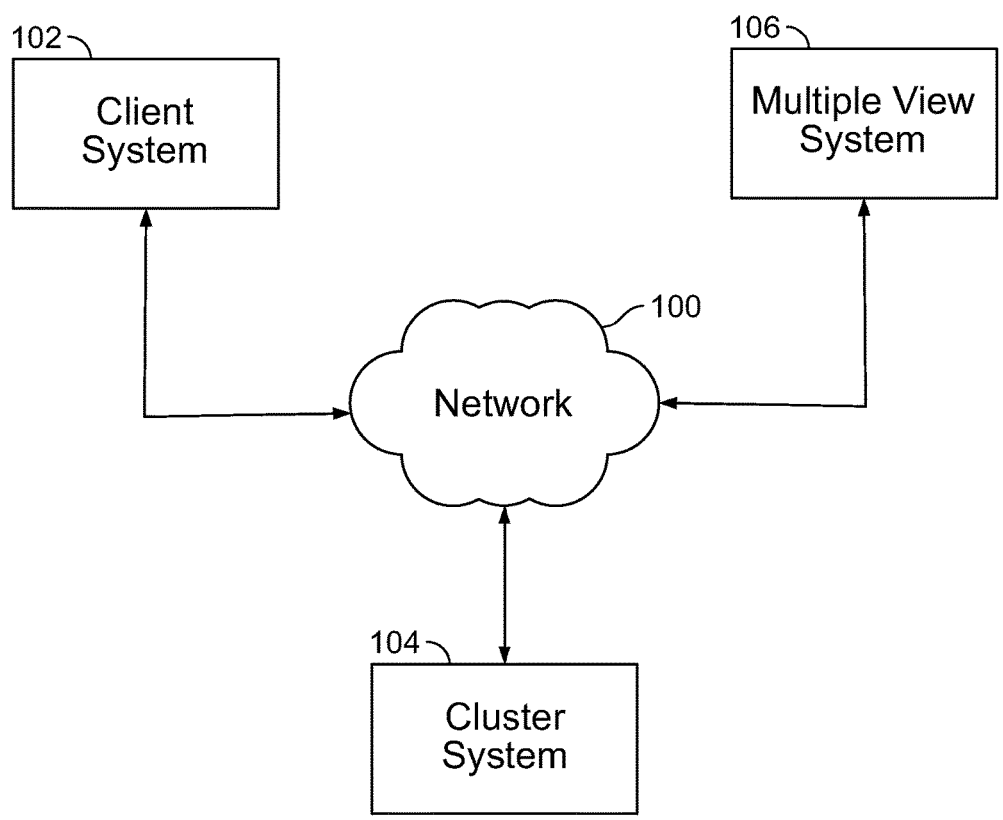
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for multiple views for a notebook comprises an input interface to receive a notebook and a processor to load the notebook into a shell, wherein the shell executes the notebook using a cluster, receive an indication to view a dashboard associated with the notebook, and provide dashboard display information, wherein the dashboard comprises a page layout display. In some embodiments, the system additionally comprises a memory coupled to the processor and configured to provide the processor with instructions.

In some embodiments, a system for multiple views for a notebook comprises a system for determining an output from a notebook file. In some embodiments, a notebook comprises a sequential interactive code file comprising a set of code sections. In some embodiments, one or more of the code sections that when executed produce(s) an output. A first view for the notebook comprises a code window comprising each of the code sections and any associated output. A second view for the notebook comprises a dashboard view. In some embodiments, a dashboard view comprises a set of output elements (e.g., graphs, tables, etc.). The dashboard view is configurable by a user to move the output elements, resize the output elements, title the output elements, configure the output elements, or manipulate the output elements in any other appropriate way. In some embodiments, the dashboard view comprises an update button for causing the notebook to run or for causing a code section of the set of code sections to run. In some embodiments, a dashboard view is associated with a notebook. In some embodiments, multiple dashboard views (e.g., comprising different configurations) are associated with a notebook. A third view for the notebook comprises a presentation view. In some embodiments, a presentation view comprises an alternate view associated with a dashboard view. In some embodiments, a presentation view comprises a dashboard view configured for presentation (e.g., a view of output elements without configuration elements, for view of output data). In some embodiments, the presentation view comprises an update button for causing the notebook to run or for causing a code section of the set of code sections to run using a cluster. In some embodiments, the cluster system comprises a master system controlling a set of worker systems. A client or user system issues a job to the master system, which breaks it into tasks that can be executed in parallel by the worker systems. The client system stores code for execution on the cluster system, as well as output results associated with the code that are received from the execution of the code on the cluster system.

FIG. 1 is a block diagram illustrating an embodiment of a network system. In some embodiments, the network system of FIG. 1 comprises a system for multiple display views for a notebook. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Client system 102, cluster system 104, and notebook system 106 communicate via network 100. In some embodiments, client system 102 comprises a computing system client. In various embodiments, client system 102 comprises a client system for requesting computing jobs, for managing a computing cluster, for data analysis programming, for creating a notebook, for creating a dashboard view associated with a notebook, for viewing output data from a notebook, for viewing a presentation view associated with a dashboard view, or for any other appropriate purpose. Cluster system 104 comprises a cluster computing system. In various embodiments, cluster system 104 comprises a cluster computing system for performing computing jobs, for analyzing data, for producing output data, for processing a notebook, for providing data for a dashboard view, for providing data for a presentation view, or for any other appropriate purpose. Multiple view system 106 comprises a system for managing multiple view data. In some embodiments, multiple view system 106 comprises a system for managing multiple views for a notebook. In various embodiments, multiple view system 106 comprises a system for receiving a notebook, for receiving an indication to create a dashboard view associated with a notebook, for receiving configuration information associated with a dashboard view, for receiving an indication to run a computation, for providing a computation to cluster system 104, for receiving computation results from cluster system 104, for providing output data to client system 102, for providing a dashboard view to client system 102, for providing a presentation view to client system 102, or for any other appropriate purpose. In some embodiments, client system 102 comprises a processor and a memory. In various embodiments, client system 102 comprises a single-processor computer, a multiple-processor computer, a plurality of computers, a mobile computer, a tablet computer, or any other appropriate computer. In some embodiments, cluster system 104 comprises a processor and a memory. In some embodiments, cluster system 104 comprises a cluster of computers (e.g., a plurality of interconnected computers for executing a large computing job as a set of smaller pieces of that computing job). In various embodiments, each of the one or more computers of cluster system 104 comprises a single-processor computer, a multiple-processor computer, a plurality of computers, a mobile computer, a tablet computer, or any other appropriate computer. In some embodiments, multiple view system 106 comprises a processor and a memory. In various embodiments, multiple view system 106 comprises a single-processor computer, a multiple-processor computer, a plurality of computers, a mobile computer, a tablet computer, or any other appropriate computer.

Figure 2:
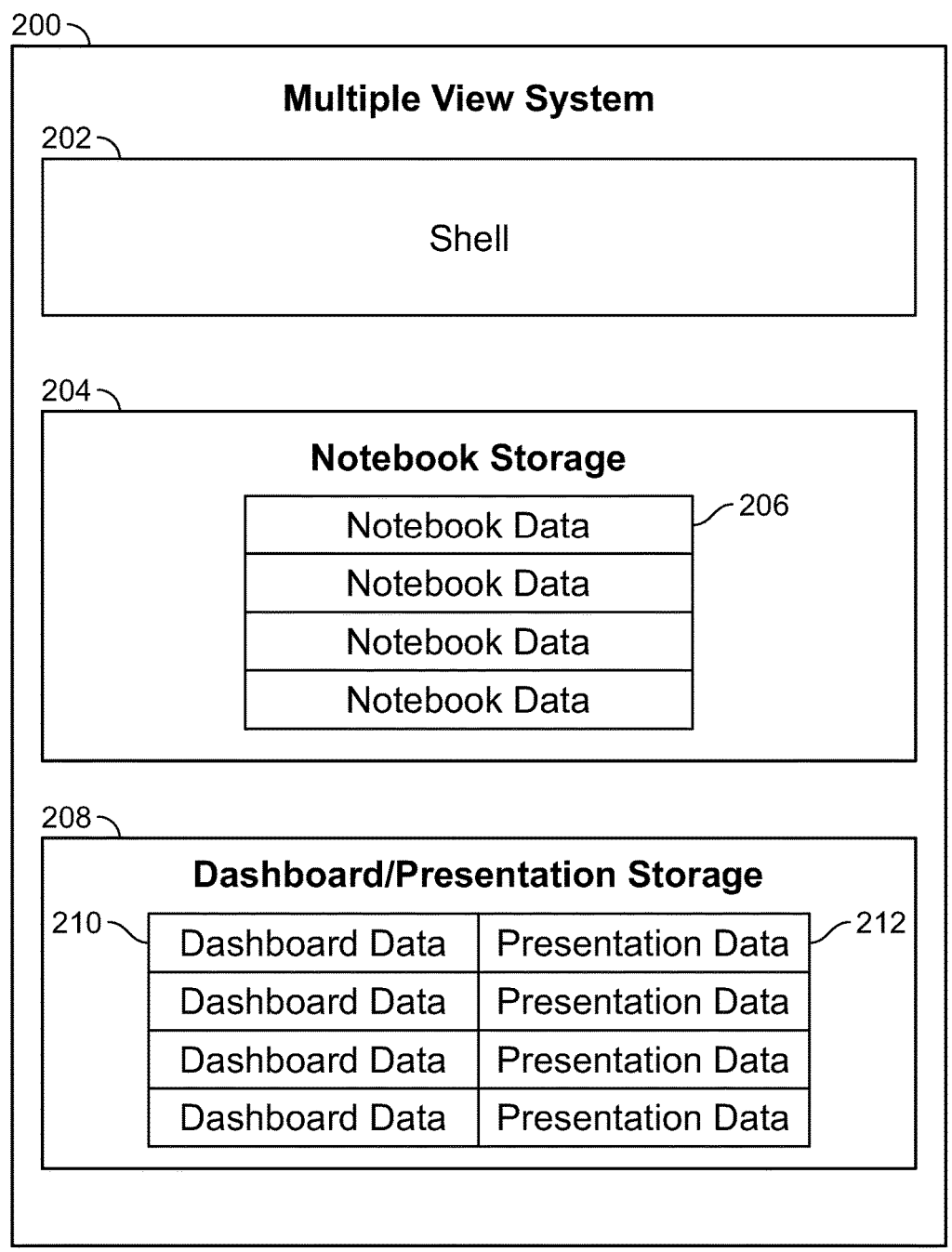
FIG. 2 is a block diagram illustrating an embodiment of a multiple view system.

FIG. 2 is a block diagram illustrating an embodiment of a multiple view system. In some embodiments, multiple view system 200 comprises multiple view system 106 of FIG. 1. In the example shown, multiple view system 200 comprises shell 202. In some embodiments, shell 202 comprises a shell for running a process. In various embodiments, shell 202 comprises an application for loading a notebook, for communicating with a user system over a network, for providing code to a cluster system, for indicating to a cluster system to execute code, for converting code for execution on a cluster, for receiving results of executing code on the cluster, for providing a notebook view, for providing a dashboard view, for providing a presentation view, or for any other appropriate purpose. In various embodiments, the code associated with the notebook comprises code in one or more of the following languages: code in R, code in Python, code in Scala, or code in SQL. In some embodiments, when multiple view system 200 receives a notebook (e.g., from a user system), the notebook is loaded into shell 202 (e.g., for processing, for conversion for execution on a cluster, to be provided to a cluster, etc.). In some embodiments, when multiple view system 200 receives a notebook, the notebook is stored in notebook storage 204. Notebook storage stores notebook data comprising a plurality of notebooks (e.g., notebook data 206). In some embodiments, a notebook comprises a sequential interactive code file comprising a set of code sections. In some embodiments, one or more code sections of the set of code sections produce an output. In some embodiments, a notebook is run on a cluster. Multiple view system 200 provides a notebook view of a notebook comprising each of the one or more code sections of the set of code sections and any corresponding output. Multiple view system 200 additionally provides one or more dashboard views. Each dashboard view is associated with a notebook of the plurality of notebooks. In some embodiments, a dashboard view comprises a set of output elements associated with the notebook (e.g., associated with output from code sections of the notebook). In some embodiments, a dashboard view comprises a set of configuration elements (e.g., for arranging and/or configuring the output elements). Dashboard data associated with a dashboard view is stored in dashboard/presentation storage 208 (e.g., dashboard data 208). In some embodiments, multiple dashboards are associated with a notebook of the plurality of notebooks. Multiple view system 200 additionally provides a presentation view associated with each dashboard view. Presentation view data is stored in dashboard/presentation storage 208 associated with the associated dashboard data (e.g., presentation data 212 is associated with dashboard data 210). In some embodiments, a presentation view comprises a dashboard view configured for presentation (e.g., a view of output elements without configuration elements, for view of output data).

Figure 3:
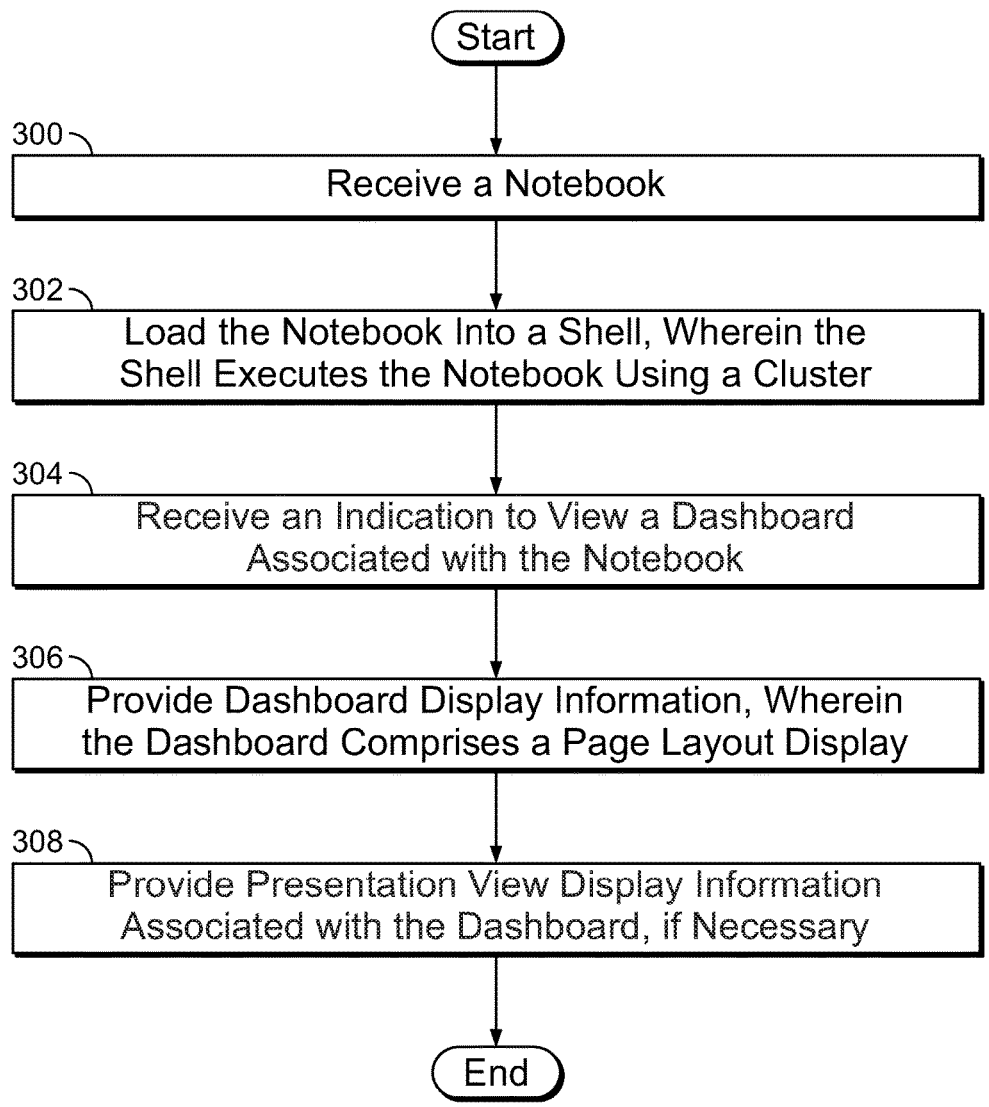
FIG. 3 is a flow diagram illustrating an embodiment of a process for multiple views for a notebook.

FIG. 3 is a flow diagram illustrating an embodiment of a process for multiple views for a notebook. In some embodiments, the process of FIG. 3 is executed by a multiple view system (e.g., multiple view system 106 of FIG. 1). In the example shown, in 300, a notebook is received (e.g., from a user system). In 302, the notebook is loaded into a shell, wherein the shell executes the notebook using a cluster. In some embodiments, an indication is provided to the cluster to execute the notebook. In some embodiments, execution results are received. In 304, an indication is received to view a dashboard associated with the notebook. In 306, dashboard display information is provided, wherein the dashboard comprises a page layout display. In 308, presentation view display information associated with the dashboard is provided, if necessary.

Figure 4:
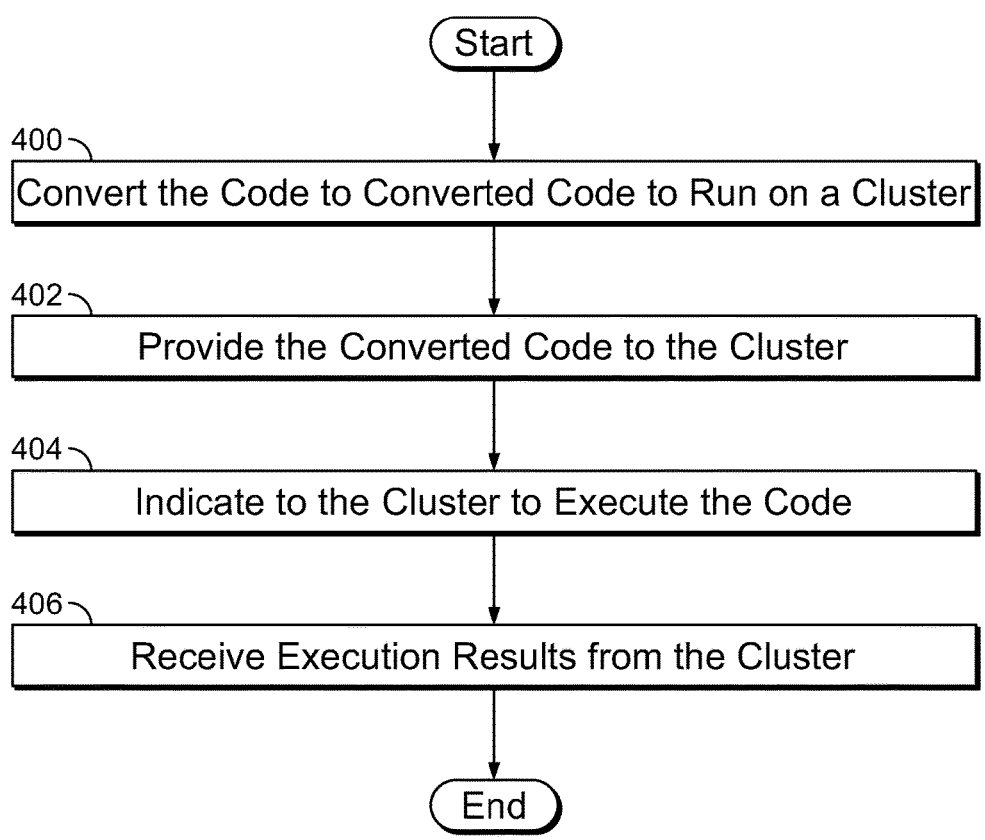
FIG. 4 is a flow diagram illustrating an embodiment of a process for executing a notebook using a cluster.

FIG. 4 is a flow diagram illustrating an embodiment of a process for executing a notebook using a cluster. In some embodiments, the process of FIG. 4 is executed by a shell of a notebook system (e.g., shell 202 of FIG. 2). In the example shown, in 400, the code is converted into converted code to run on a cluster. In various embodiments, converting the code into a converted code to run on a cluster comprises compiling the code, interpreting the code, converting the code for parallel processing, or converting the code in any other appropriate way. In 402, the converted code is provided to the cluster. In 404, it is indicated to the cluster to execute the code. For example, it is indicated to configure resources of a cluster of appropriate number/size needed to execute the converted code and its associated data, and the code is provided to the configured resources and executed. In some embodiments, an execution service takes individual snippets of a notebook. The execution service passes each snippet to an underlying execution environment inside the cluster. When the snippet is passed, a configuration for executing the snippet can be either already present or provided with the snippet. Each snippet from a notebook is executed in a pre-defined order specified by its ordering in the notebook. The execution service takes the code from the notebook and pass it to the underlying execution environment in a format that can be interpreted by the execution environment (e.g., in some cases providing appropriate translation, compilation, etc.). If the execution service determines that additional resources are required, the execution service negotiates the resolution of the resources required between the notebook and the underlying cluster. In 406, execution results are received from the cluster.

Figure 5:
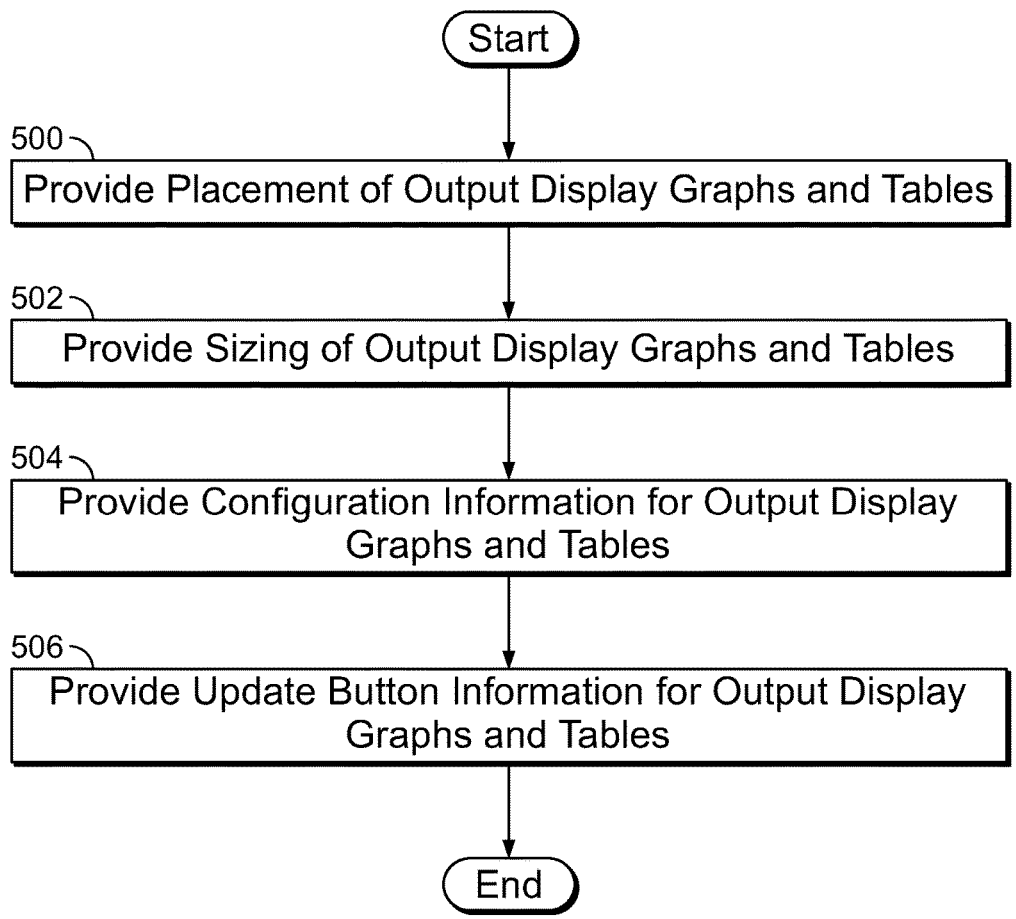
FIG. 5 is a flow diagram illustrating an embodiment of a process for providing dashboard display information.

FIG. 5 is a flow diagram illustrating an embodiment of a process for providing dashboard display information. In some embodiments, the process of FIG. 5 implements 306 of FIG. 3. In the example shown, in 500, placement of output display graphs and tables is provided. In some embodiments, placement of output display graphs and table comprises a location of each graph and/or table. In some embodiments, placement information comprises stack/float information (e.g., whether the placement of the output display graphs and tables in the dashboard should stack, e.g., fit tightly together, or float, e.g., sit at an arbitrary location where they are placed). In 502, sizing of output display graphs and tables is provided. In some embodiments, sizing information comprises a size for each output display graph and/or table. In 504, configuration information for output display graphs and tables is provided. In various embodiments, configuration information comprises an output display object title, run button on/off information, object run options, or any other appropriate configuration information. In 506, update button information for output display graphs and tables is provided.

Figure 6:
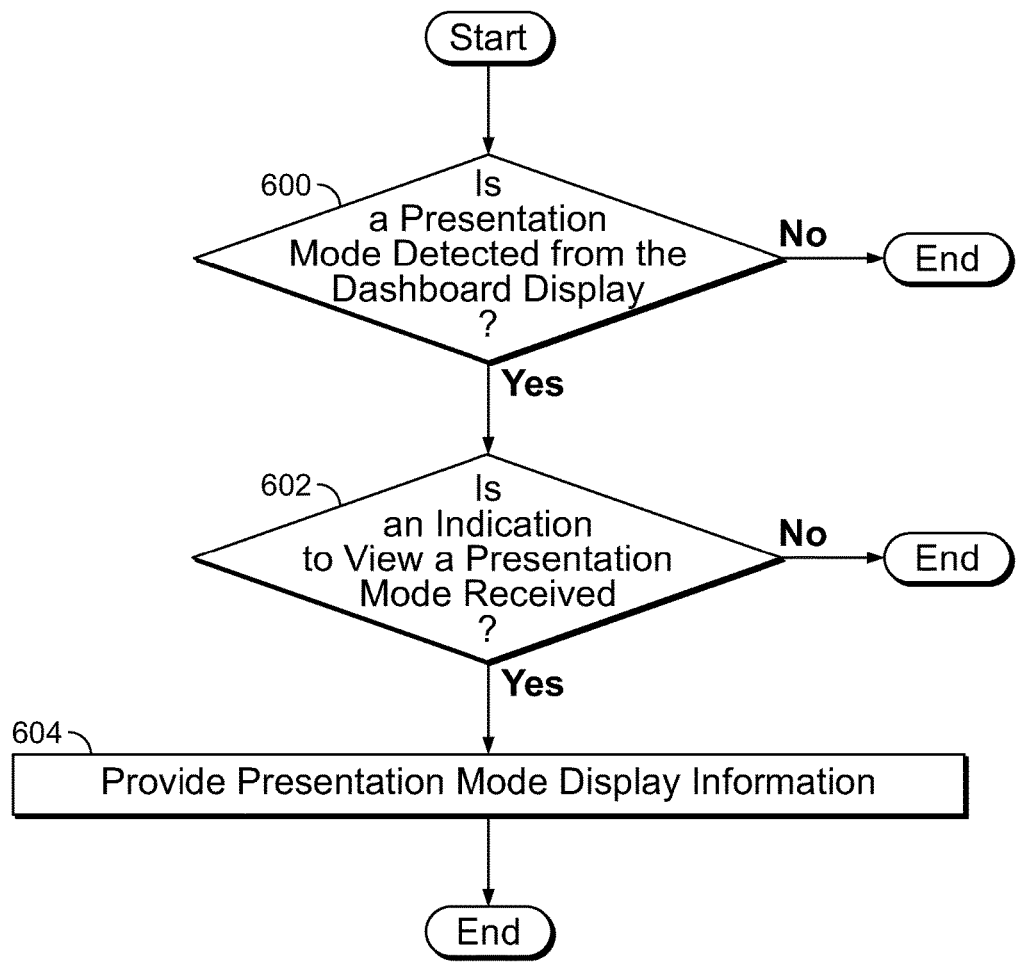
FIG. 6 is a flow diagram illustrating an embodiment of a process for providing presentation view display information associated with the dashboard, if necessary.

FIG. 6 is a flow diagram illustrating an embodiment of a process for providing presentation view display information associated with the dashboard, if necessary. In some embodiments, the process of FIG. 6 implements 308 of FIG. 3. In the example shown, in 600, it is determined whether a presentation mode is detected from the dashboard display. In some embodiments, a presentation mode is required to be set up before presentation view display information can be provided. In some embodiments, setting up a presentation mode comprises configuring presentation mode display information. In the event it is determined that a presentation mode is not detected from the dashboard display, the process ends. In the event it is determined that a presentation mode is detected from the dashboard display, control passes to 602. In 602, it is determined whether an indication to view a presentation mode is received. In some embodiments, an indication to view a presentation mode is performed by a user from the dashboard display. In the event an indication to view a presentation mode is not received, the process ends. In the event an indication to view a presentation mode is received, control passes to 604. In 604, presentation mode display information is provided.

Figure 7:
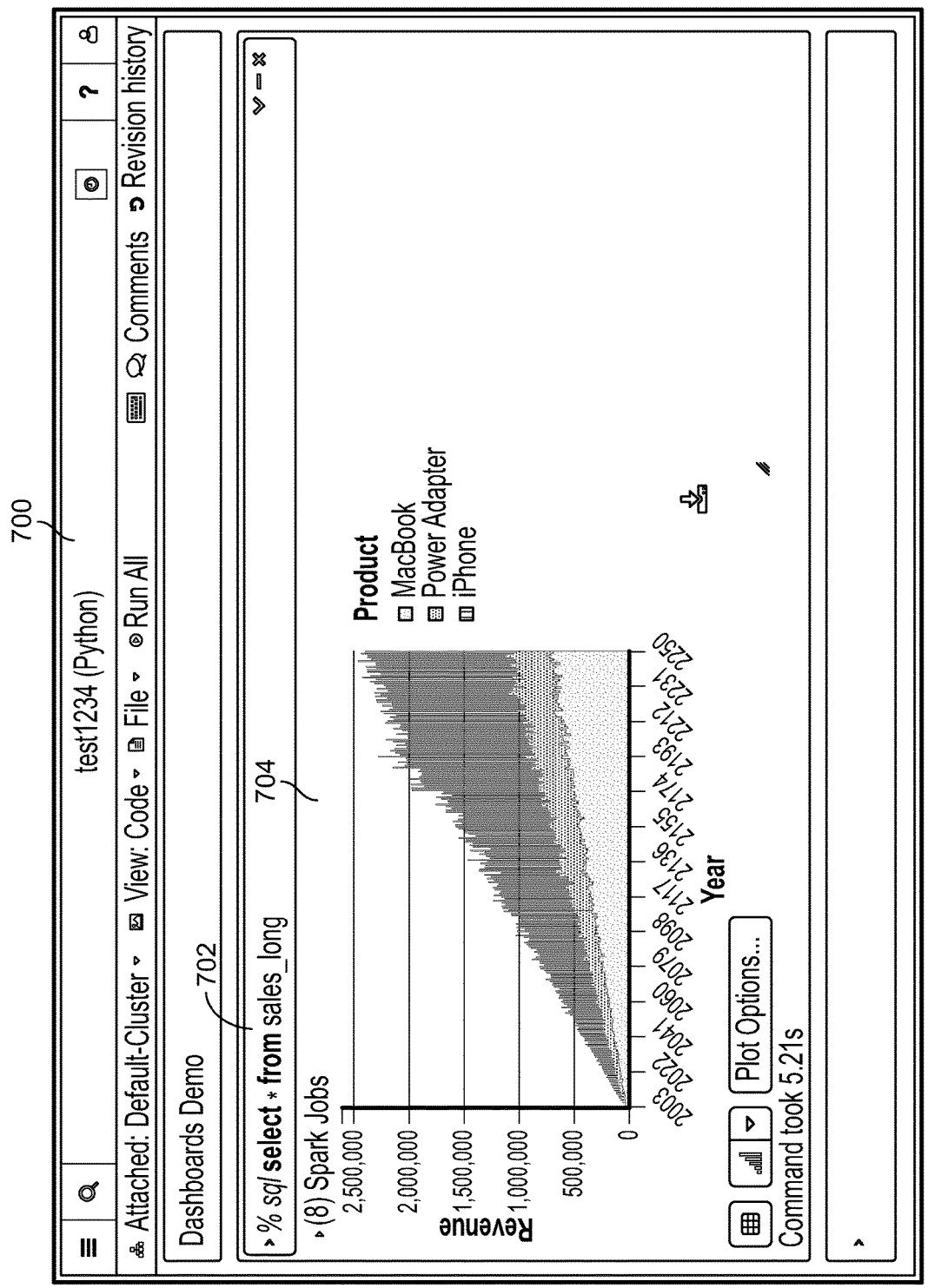
FIG. 7 is a diagram illustrating an embodiment of a notebook view.

FIG. 7 is a diagram illustrating an embodiment of a notebook view. In some embodiments, notebook view 700 of FIG. 7 comprises a notebook view provided by a multiple view system (e.g., multiple view system 106 of FIG. 1). In the example shown, notebook 700 comprises code section 702 and output 704. In some embodiments, output 704 comprises the output associated with executing code section 702. In some embodiments, a notebook view is determined by a multiple view system from a notebook. In some embodiments, a notebook is received by the multiple view system from a user system. In some embodiments, determining a notebook view comprises determining outputs associated with executing code using a cluster computing system.

Figure 8:
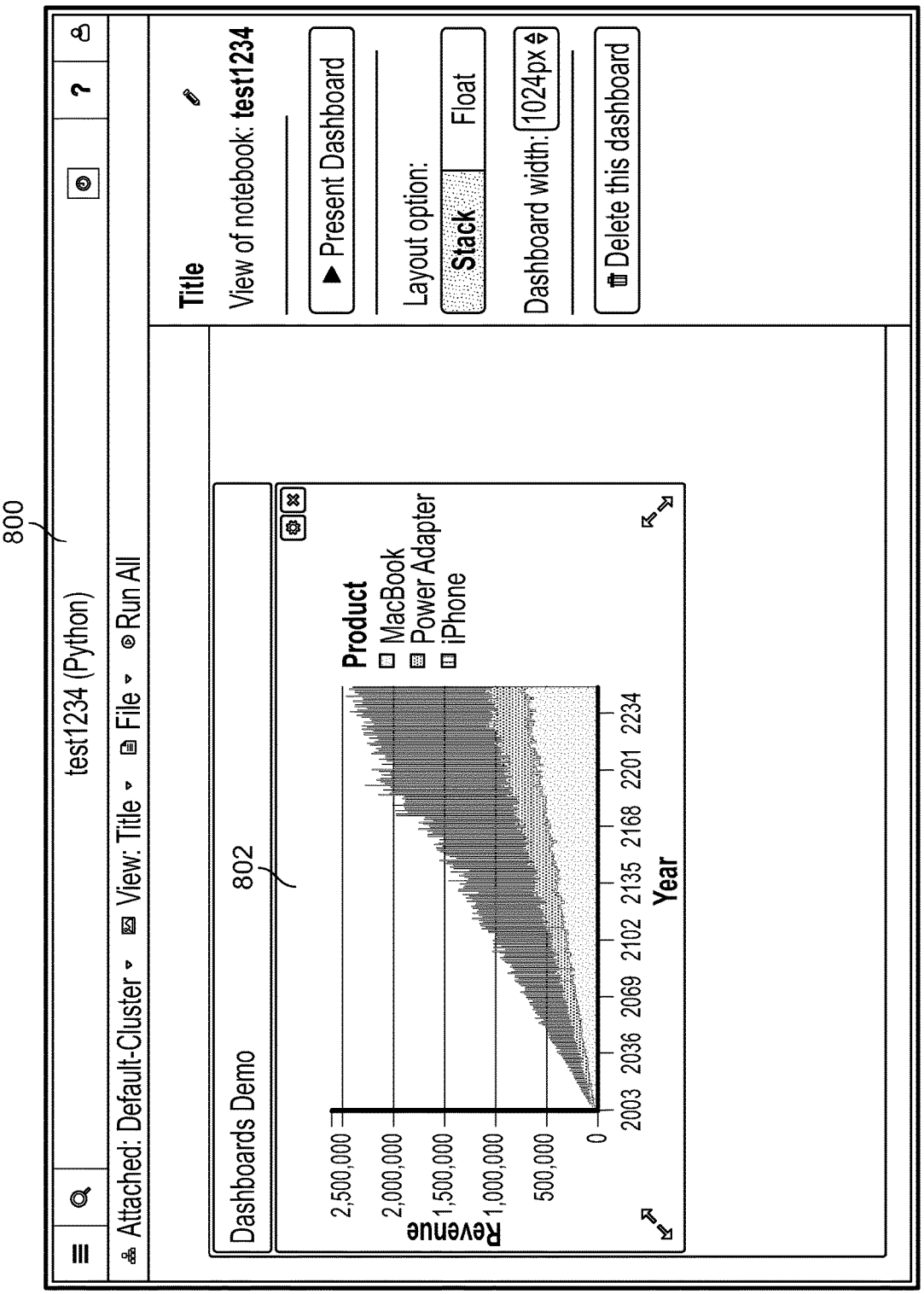
FIG. 8 is a diagram illustrating an embodiment of a dashboard view.

FIG. 8 is a diagram illustrating an embodiment of a dashboard view. In some embodiments, dashboard view 800 comprises a dashboard view associated with notebook view 700 of FIG. 7. In the example shown, dashboard view 800 comprises output element 802. In some embodiments, output element 802 comprises an output associated with executing code from a notebook. In some embodiments, dashboard view 800 additionally comprises a set of user interface objects for configuring output elements (e.g., output element 802). In some embodiments, output element 802 comprises an output element with default configuration.

Figure 9:
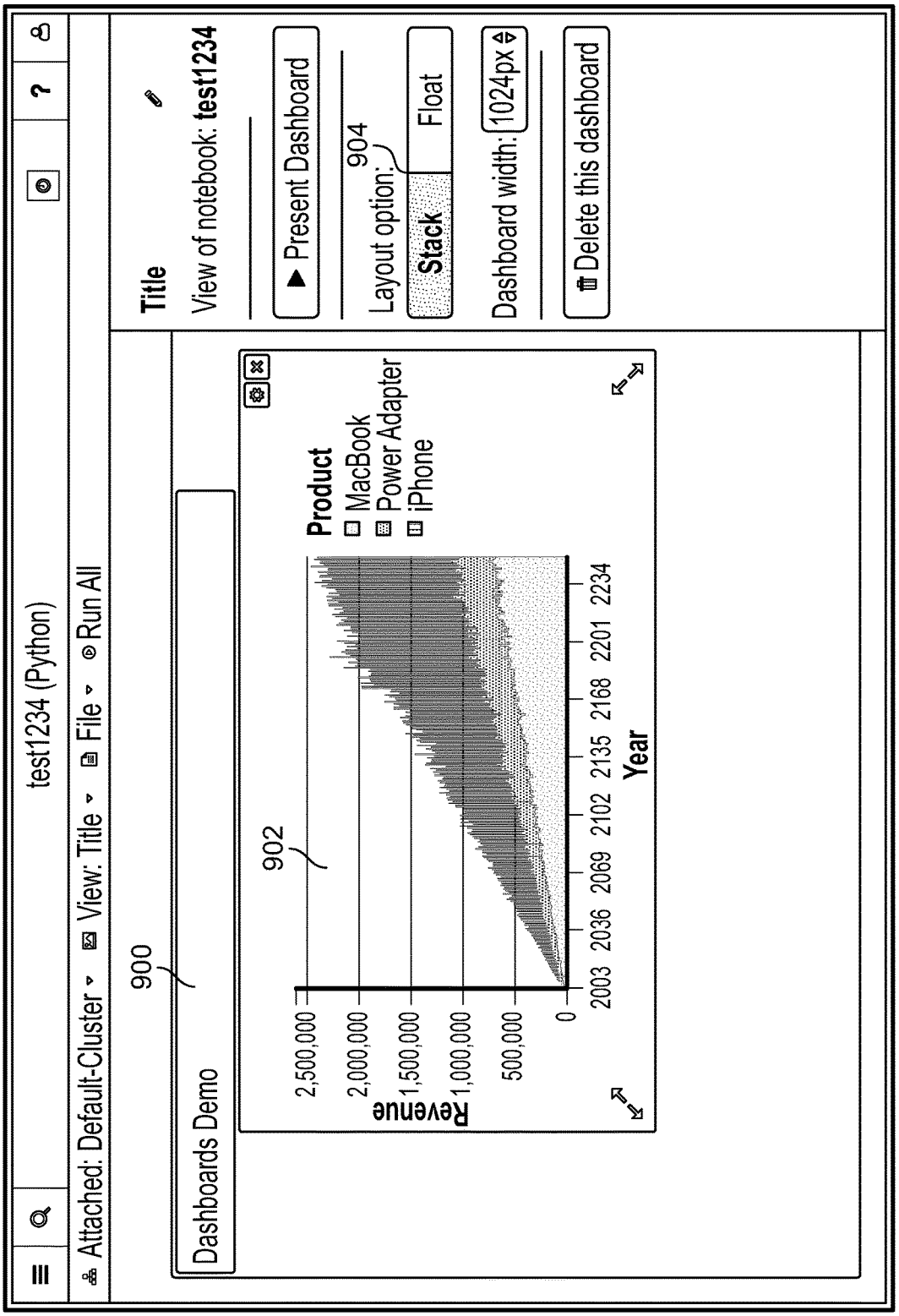
FIG. 9 is a diagram illustrating an embodiment of a dashboard view comprising a moved output element.

FIG. 9 is a diagram illustrating an embodiment of a dashboard view comprising a moved output element. In some embodiments, dashboard view 900 comprises dashboard view 800 of FIG. 8 comprising a moved output element. In some embodiments, output element 902 comprises an output element associated with executing code from a notebook. In the example shown, output element 902 has been moved from its default configuration. Dashboard view 900 additionally comprises stack/float configuration user interface element 904. In the example shown, stack/float configuration user interface element 904 is set to stack configuration (e.g., output elements of dashboard view 900 form a vertical stack, held closely together in the display).

Figure 10:
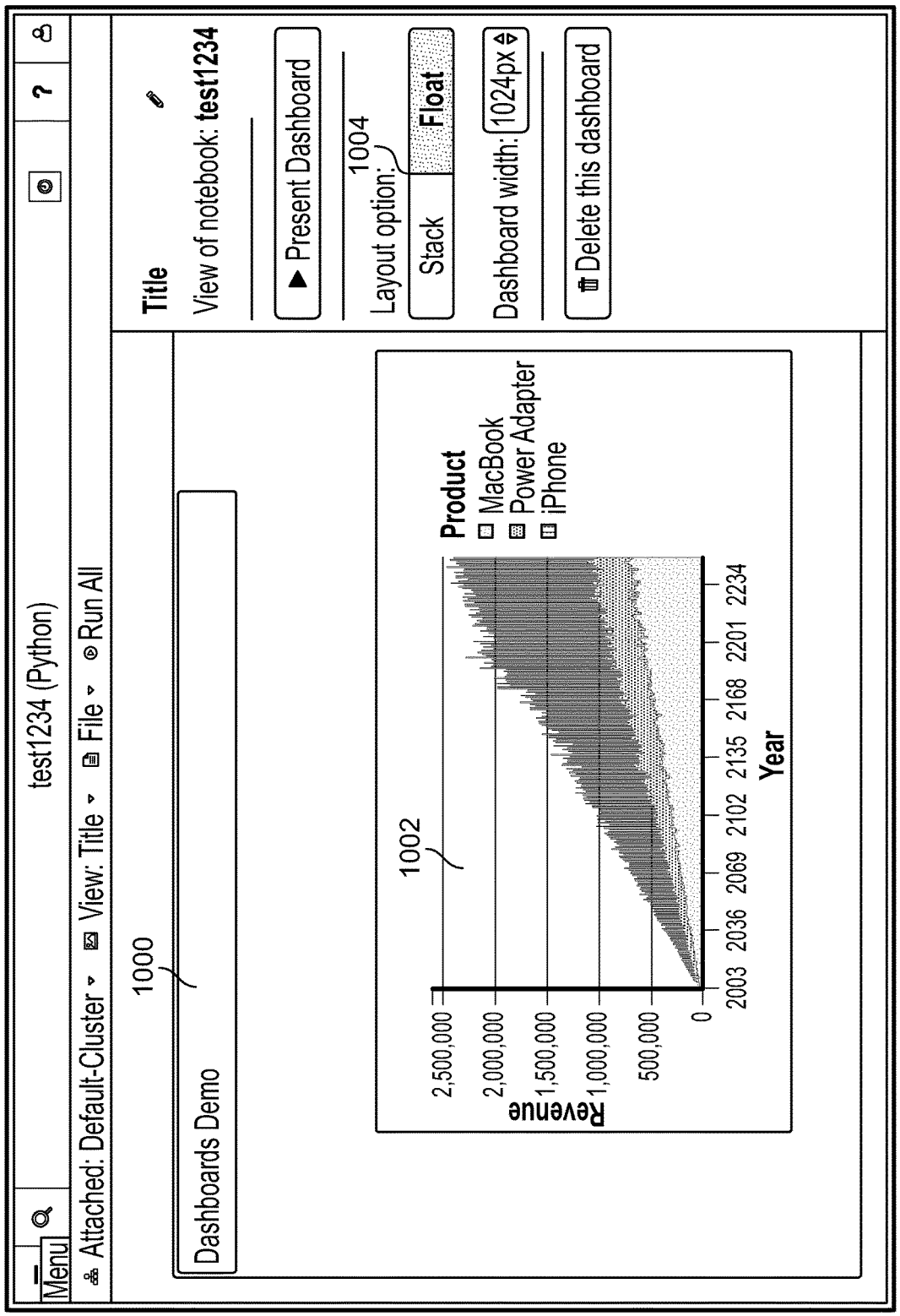
FIG. 10 is a diagram illustrating an embodiment of a dashboard view comprising a moved output element.

FIG. 10 is a diagram illustrating an embodiment of a dashboard view comprising a moved output element. In some embodiments, dashboard view 1000 comprises dashboard view 800 of FIG. 8 comprising a moved output element. In some embodiments, output element 1002 comprises an output element associated with executing code from a notebook. In the example shown, output element 1002 has been moved from its default configuration. Dashboard view 1000 additionally comprises stack/float configuration user interface element 1004. In the example shown, stack/float configuration user interface element 1004 is set to float configuration (e.g., output elements of dashboard view 1000 are allowed to float anywhere in the display desired by the user performing the configuration).

Figure 11:
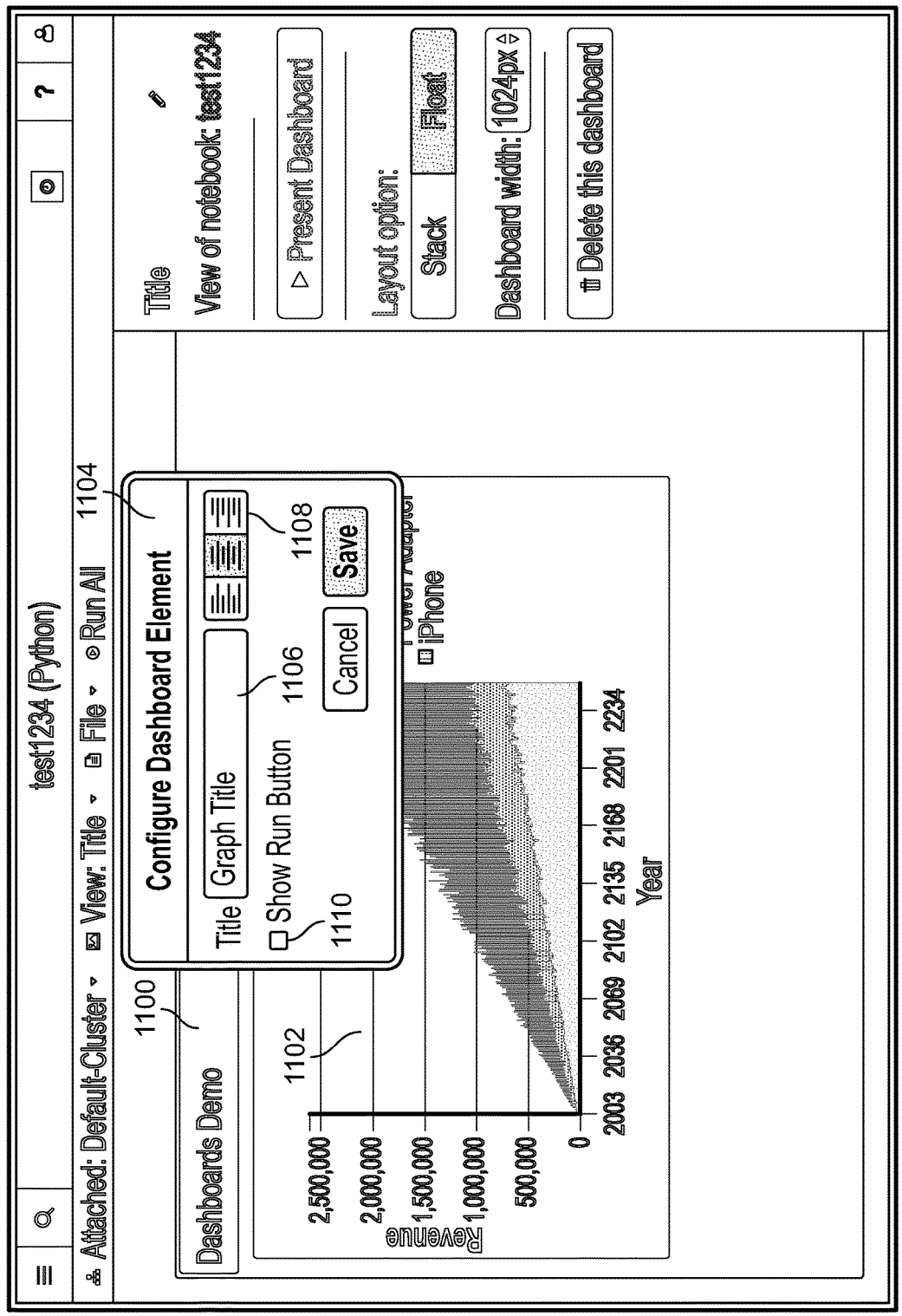
FIG. 11 is a diagram illustrating an embodiment of a dashboard view comprising a configure dashboard element dialog box.

FIG. 11 is a diagram illustrating an embodiment of a dashboard view comprising a configure dashboard element dialog box. In some embodiments, dashboard view 1100 comprises dashboard view 800 of FIG. 8 showing a configure dashboard element dialog box. In some embodiments, output element 1102 comprises an output element associated with executing code from a notebook. In the example shown, dashboard view 1100 additionally comprises configure dashboard element dialog box 1104. Configure dashboard element dialog box comprises title entry text box 1106, title justification selector 1108, and show run button checkbox 1110. Dashboard element dialog box 1104 entered configure items are saved or canceled using user selectable buttons.

Figure 12:
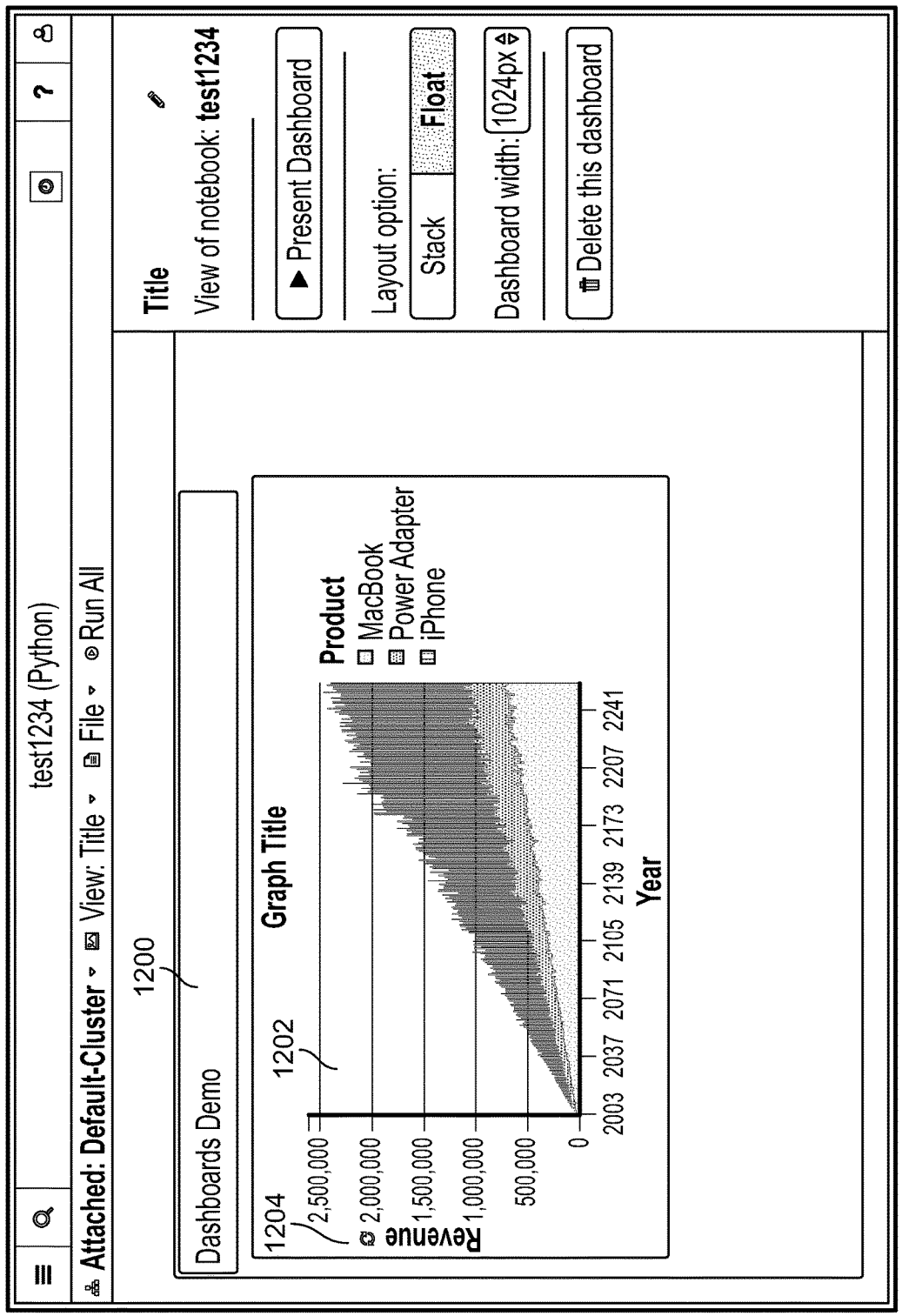
FIG. 12 is a diagram illustrating an embodiment of a dashboard view comprising a run button.

FIG. 12 is a diagram illustrating an embodiment of a dashboard view comprising a run button. In some embodiments, dashboard view 1200 comprises dashboard view 800 of FIG. 8 comprising a run button. In some embodiments, output element 1202 comprises an output element associated with executing code from a notebook. In the example shown, output element 1202 comprises run button 1204. In some embodiments, in the event a user makes an indication to run button 1204, the notebook code associated with the output element is run.

Figure 13:
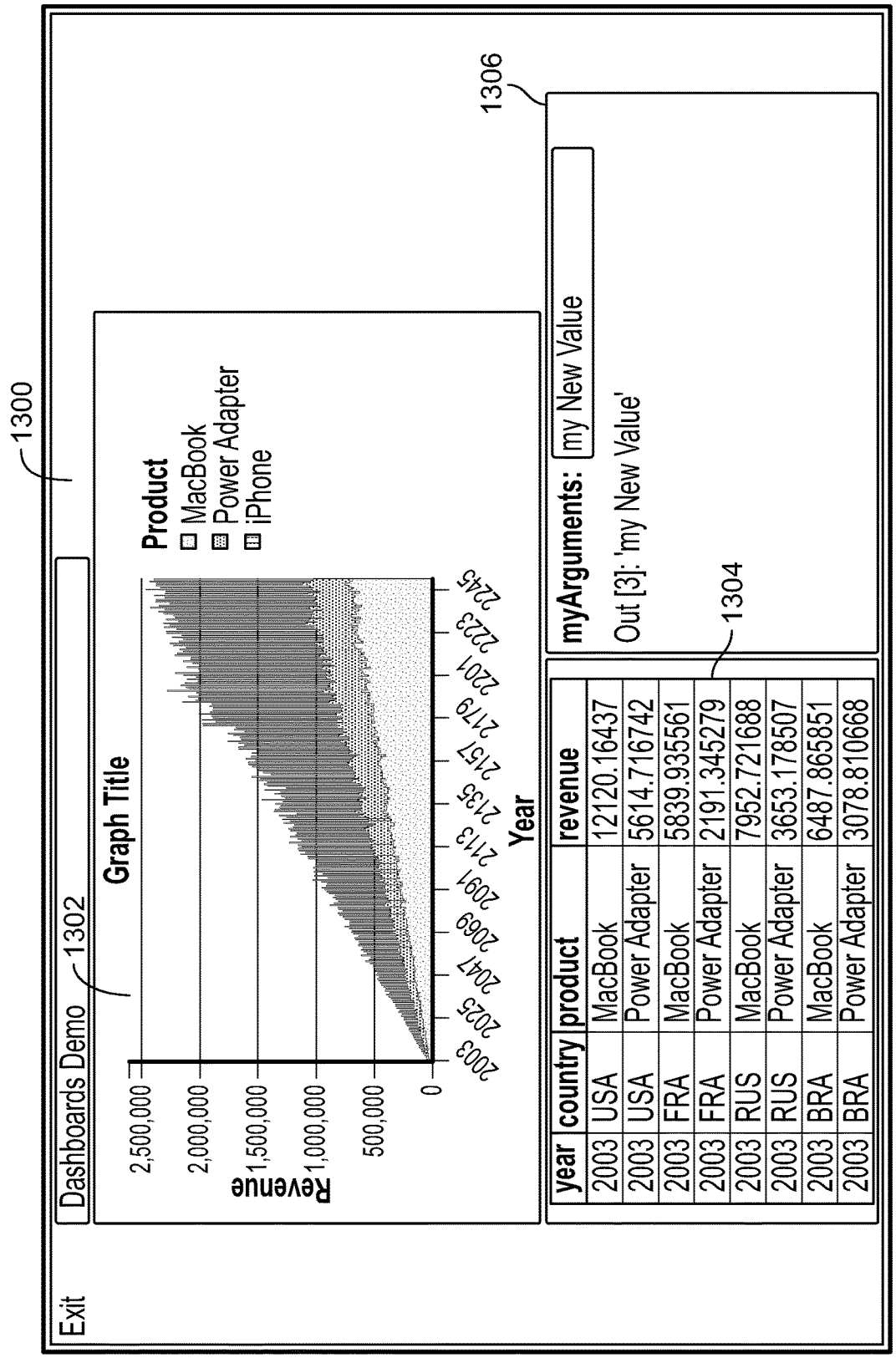
FIG. 13 is a diagram illustrating an embodiment of a presentation view.

FIG. 13 is a diagram illustrating an embodiment of a presentation view. In some embodiments, presentation view 1300 comprises a presentation view associated with dashboard view 800 of FIG. 8. In some embodiments, presentation view 1300 comprises a presentation view provided by a multiple view system for presentation. In some embodiments, presentation view 1300 comprises a clean view without controls or configuration elements. In the example shown, presentation view 1300 comprises output element 1302, output element 1304, and input element 1306. In some embodiments, input element 1306 comprises an input element to input data to code from a notebook.

Figure 14:
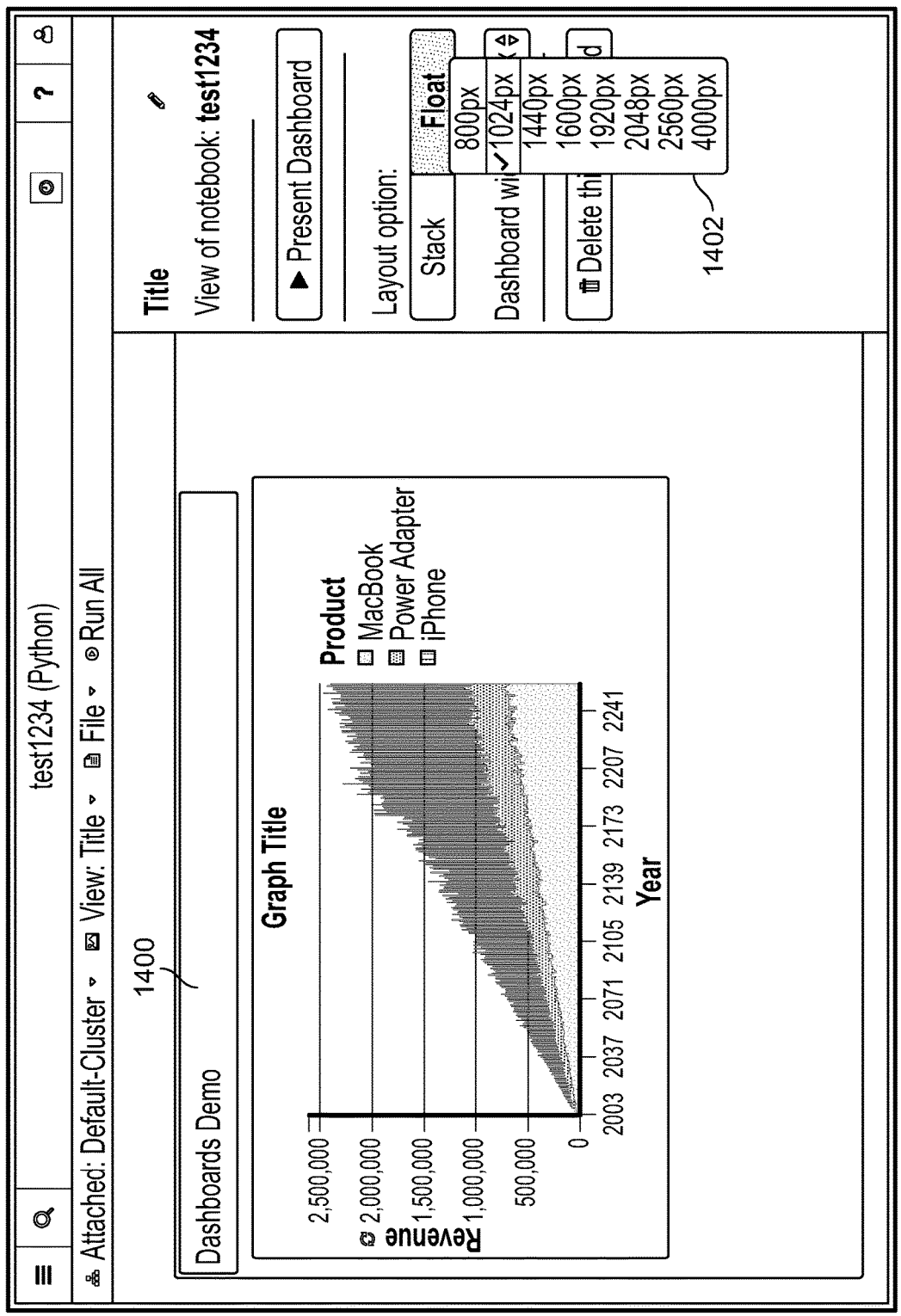
FIG. 14 is a diagram illustrating an embodiment of a dashboard view comprising a width selector.

FIG. 14 is a diagram illustrating an embodiment of a dashboard view comprising a width selector. In some embodiments, dashboard view 1400 comprises dashboard view 800 of FIG. 8 indicating a width selector. In some embodiments, width selector 1402 comprises a width selector for configuring a dashboard width. For example, a pixel selection for the width of the output display is selected (e.g., 1024 px, 1440 px, 1920 px, 2048 px, 2560 px, 4000 px, or any other appropriate pixel width).

Figure 15:
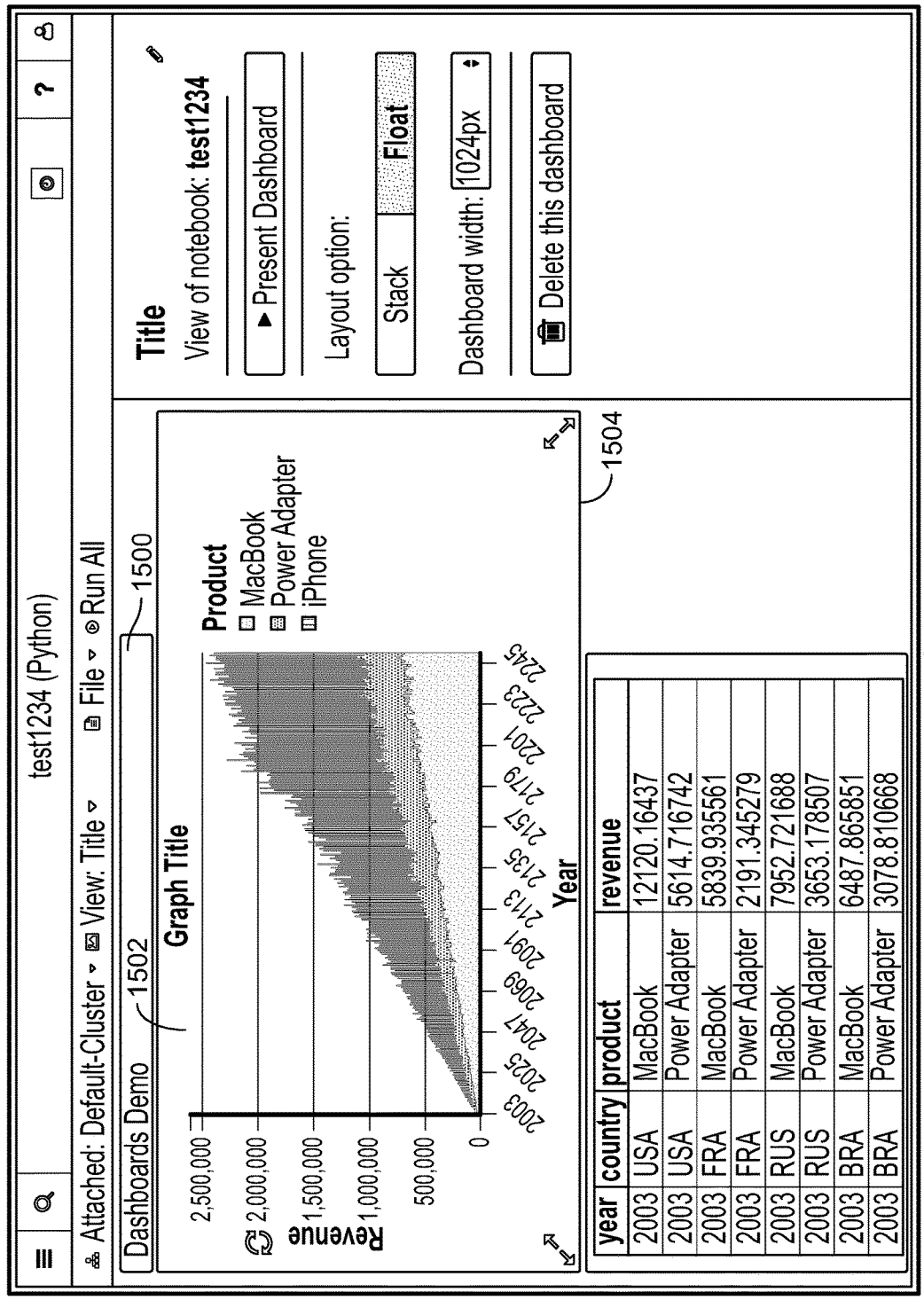
FIG. 15 is a diagram illustrating an embodiment of a dashboard view comprising an object resizing element.

FIG. 15 is a diagram illustrating an embodiment of a dashboard view comprising an object resizing element. In some embodiments, dashboard view 1500 comprises dashboard view 800 of FIG. 8 indicating an object resize element. In the example shown, dashboard view 1500 comprises output element 1500 including object resize element 1504. In some embodiments, object resize element 1504 comprises an object resize element for configuring an object size. In the example shown, the size of output element 1504 comprises an enlarged size.

Figure 16:
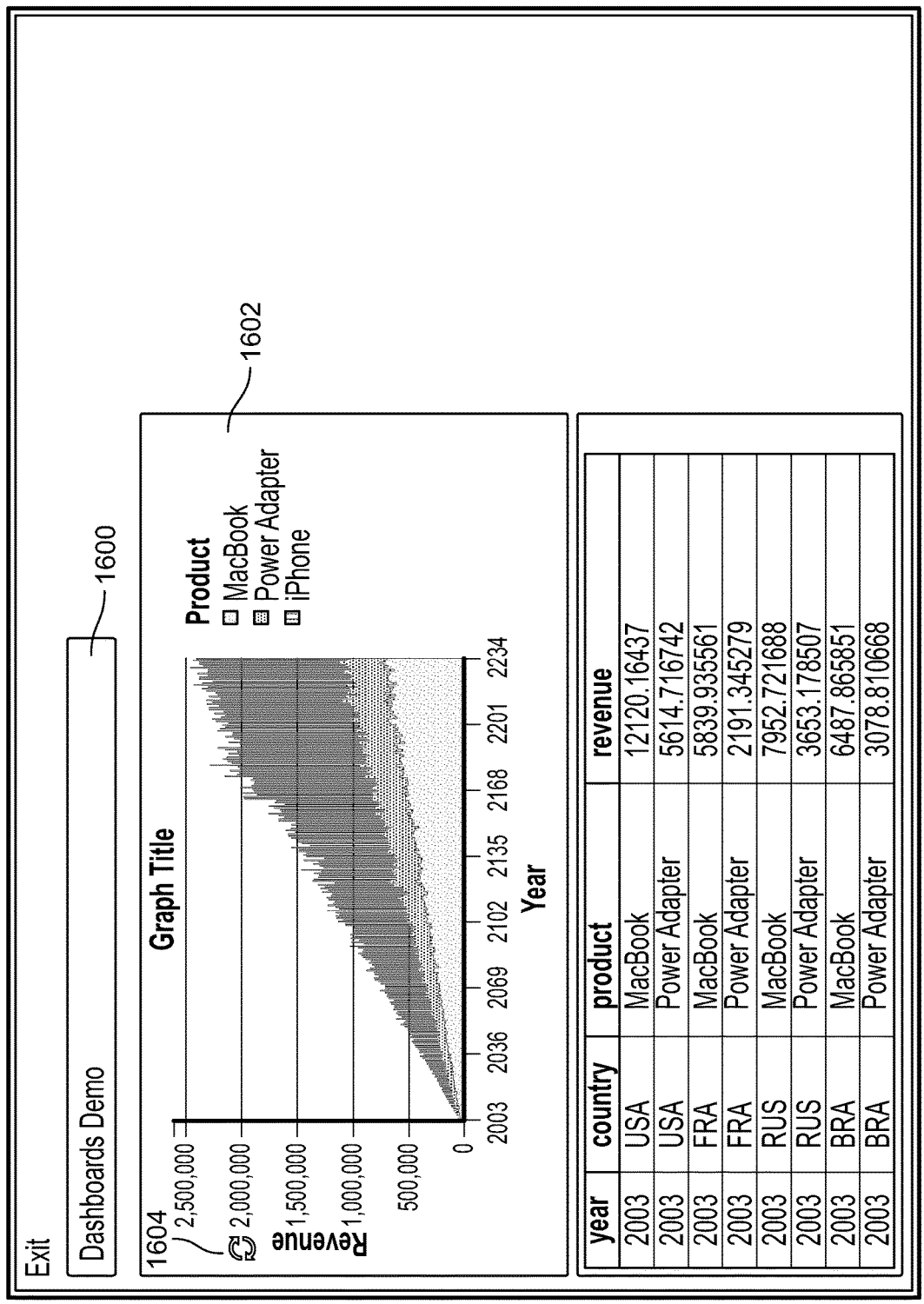
FIG. 16 is a diagram illustrating an embodiment of a presentation view comprising a run button.

FIG. 16 is a diagram illustrating an embodiment of a presentation view comprising a run button. In some embodiments, presentation view 1600 comprises presentation view 1300 of FIG. 13 comprising a run button. In some embodiments, output element 1602 comprises an output element associated with executing code from a notebook. In the example shown, output element 1602 comprises run button 1604. In some embodiments, in the event a user makes an indication to run button 1604, the notebook code associated with the output element is run.

Figure 17:
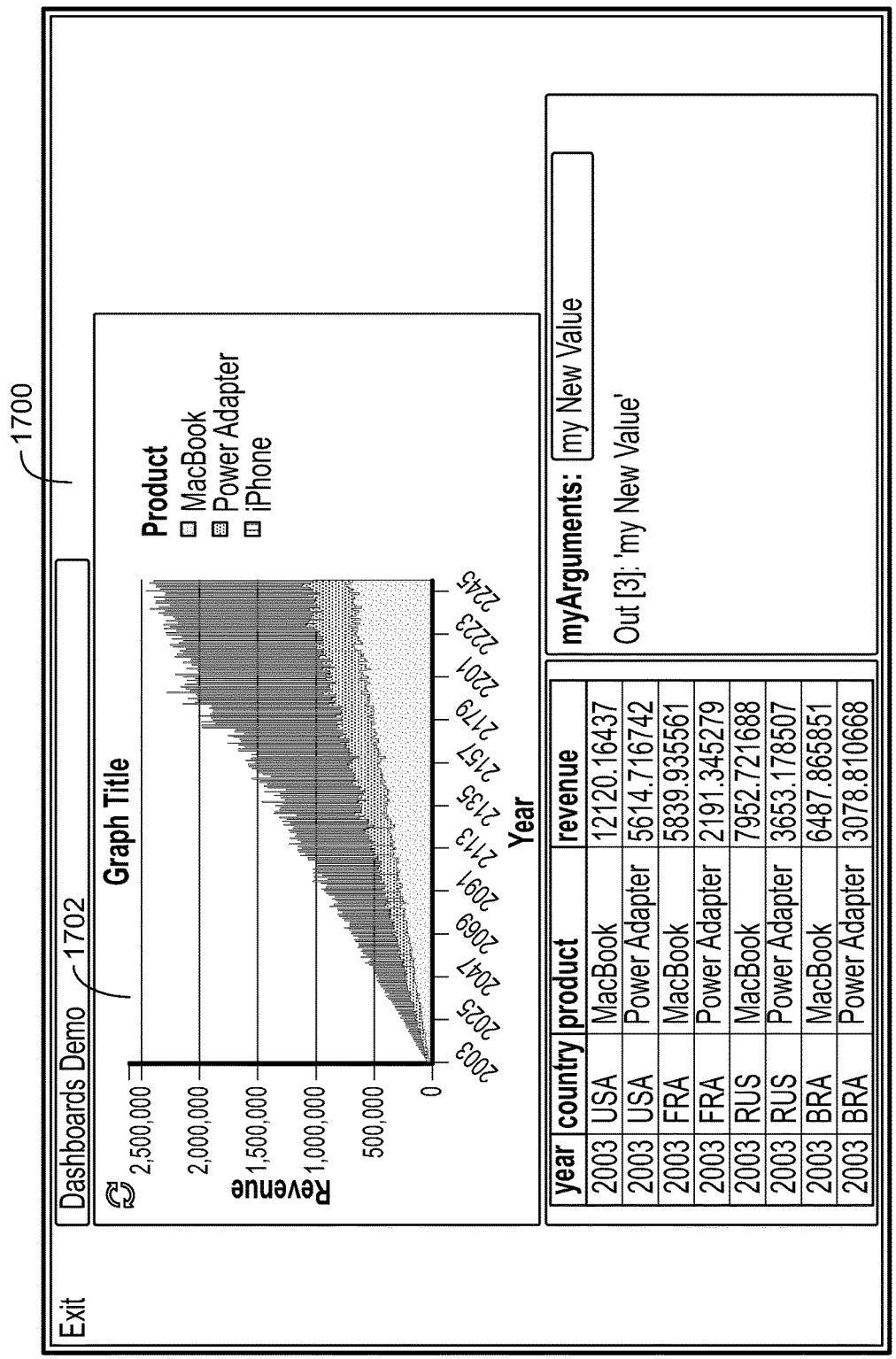
FIG. 17 is a diagram illustrating an embodiment of a presentation view comprising an output data selection.

FIG. 17 is a diagram illustrating an embodiment of a presentation view comprising an output data selection. In some embodiments, presentation view 1700 comprises presentation view 1300 of FIG. 13 comprising an output data selection. In the example shown, output data of output element 1702 is selected. For example, the highlighted element values are shown to a user on the display (e.g., 2158: 916, 464.57).

Figure 18:
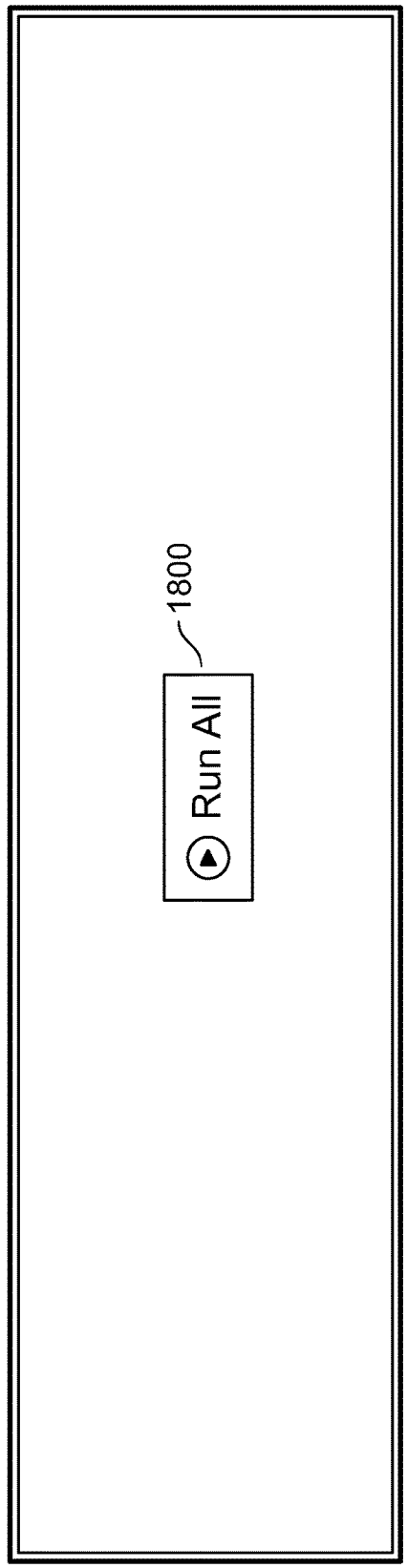
FIG. 18 is a diagram illustrating an embodiment of a run all button.

FIG. 18 is a diagram illustrating an embodiment of a run all button. In various embodiments, run all button 1800 appears as part of a notebook view, as part of a dashboard view, as part of a presentation view, or as part of any other appropriate view. In some embodiments, in the event a user makes an indication to run all button 1800 the notebook code of the associated notebook is run. In various embodiments, a run all button comprises one of the following: an icon, text, or any other appropriate signaling element of a display.

Figure 19:
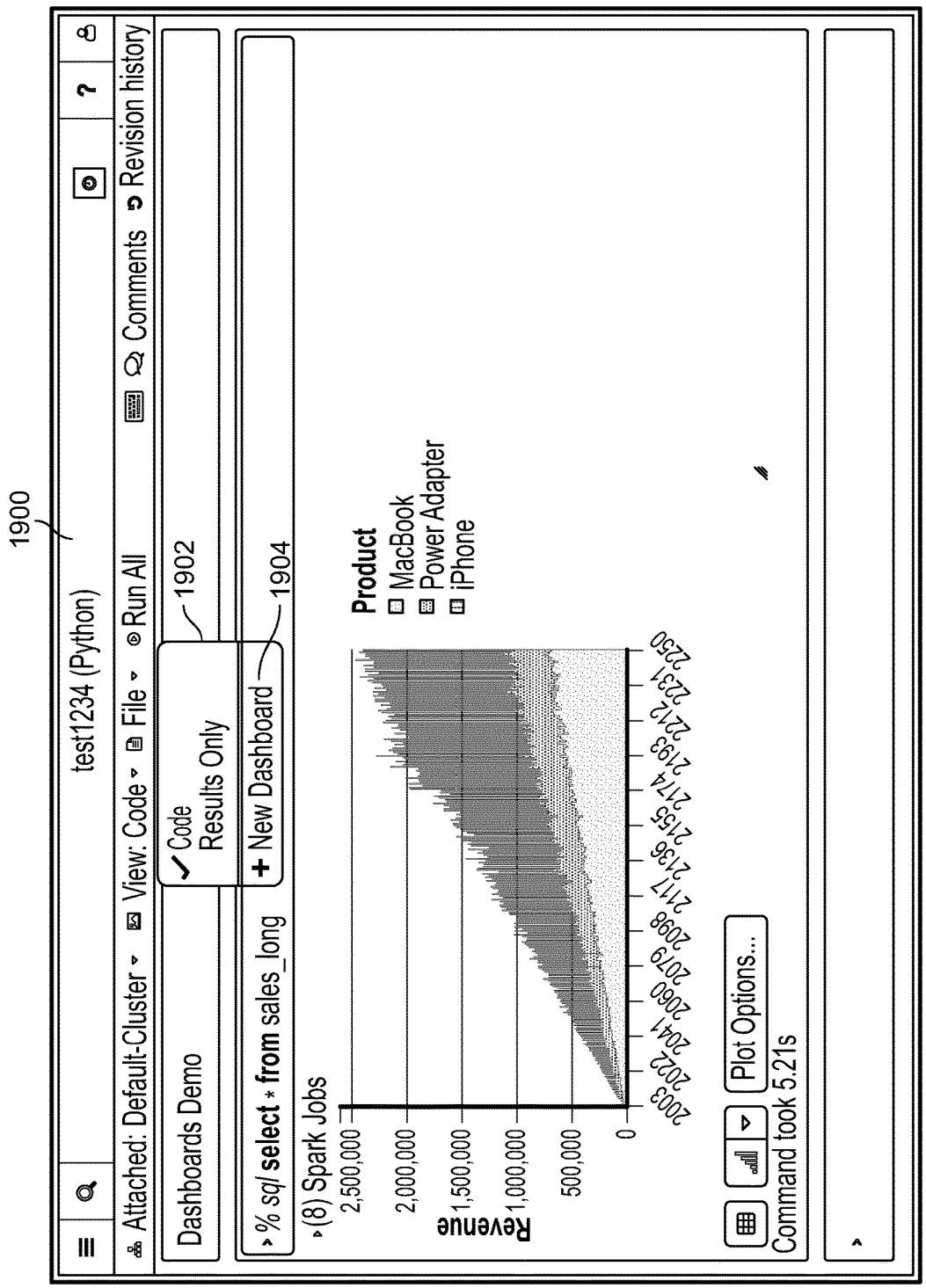
FIG. 19 is a diagram illustrating an embodiment of a notebook view including a view menu selection

FIG. 19 is a diagram illustrating an embodiment of a notebook view including a view menu selection. In some embodiments, notebook view 1900 comprises notebook view 700 of FIG. 7 including an indication to a view menu. In the example shown, view menu 1902 is displayed. View menu 1902 comprises New Dashboard selection 1904. In some embodiments, in the event a user makes an indication to New Dashboard selection 1904, a process for creating a new dashboard associated with the notebook is initiated. In some embodiments, code or results only or new dashboard are selectable elements.

Figure 20:
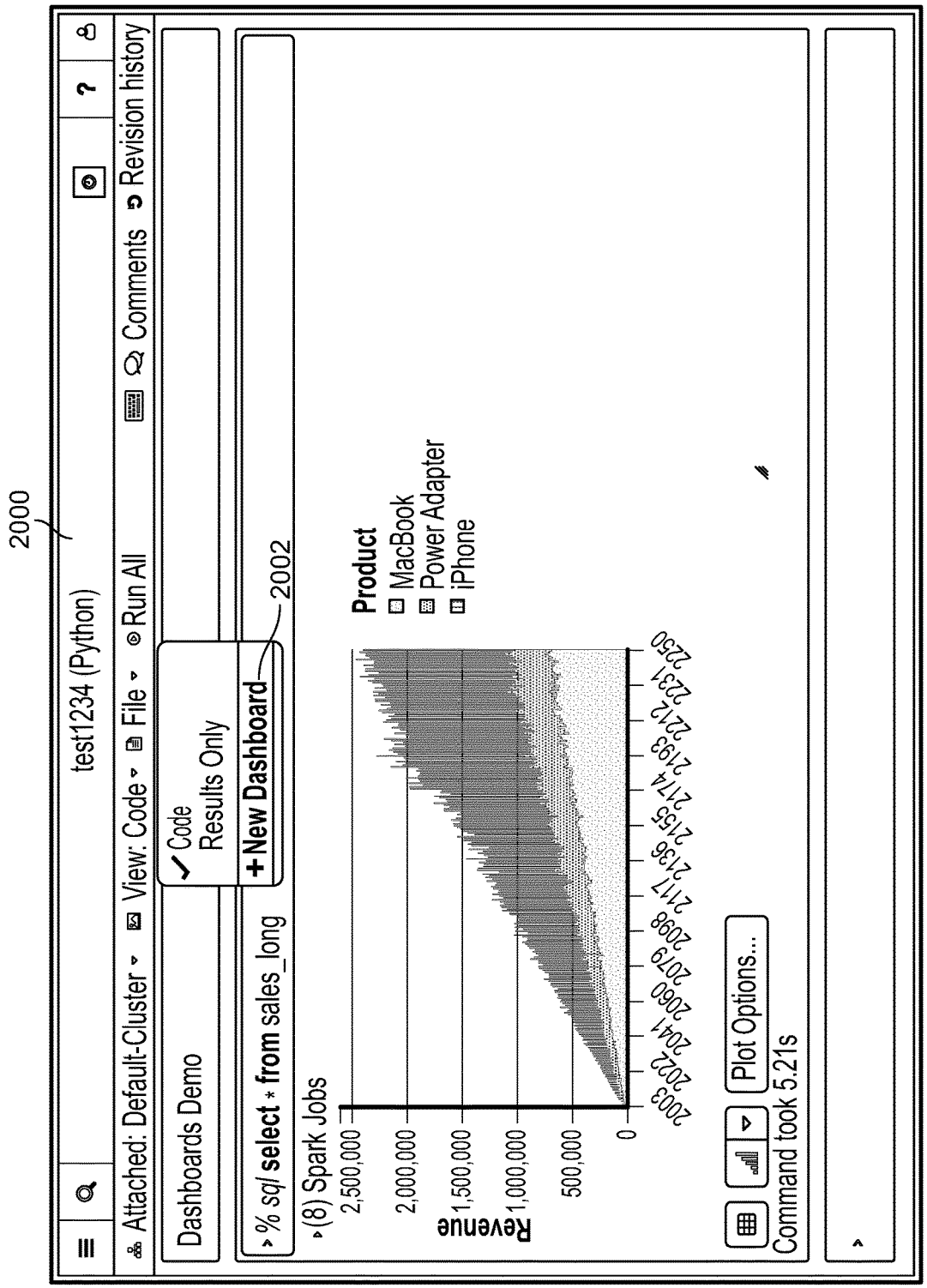
FIG. 20 is a diagram illustrating an embodiment of a notebook view including a New Dashboard selection.

FIG. 20 is a diagram illustrating an embodiment of a notebook view including a New Dashboard selection. In some embodiments, notebook view 2000 comprises notebook view 1900 of FIG. 19 including an indication to a New Dashboard selection. In the example shown, New Dashboard selection 2002 is selected. In some embodiments, a process for creating a new dashboard is initiated.

Figure 21:
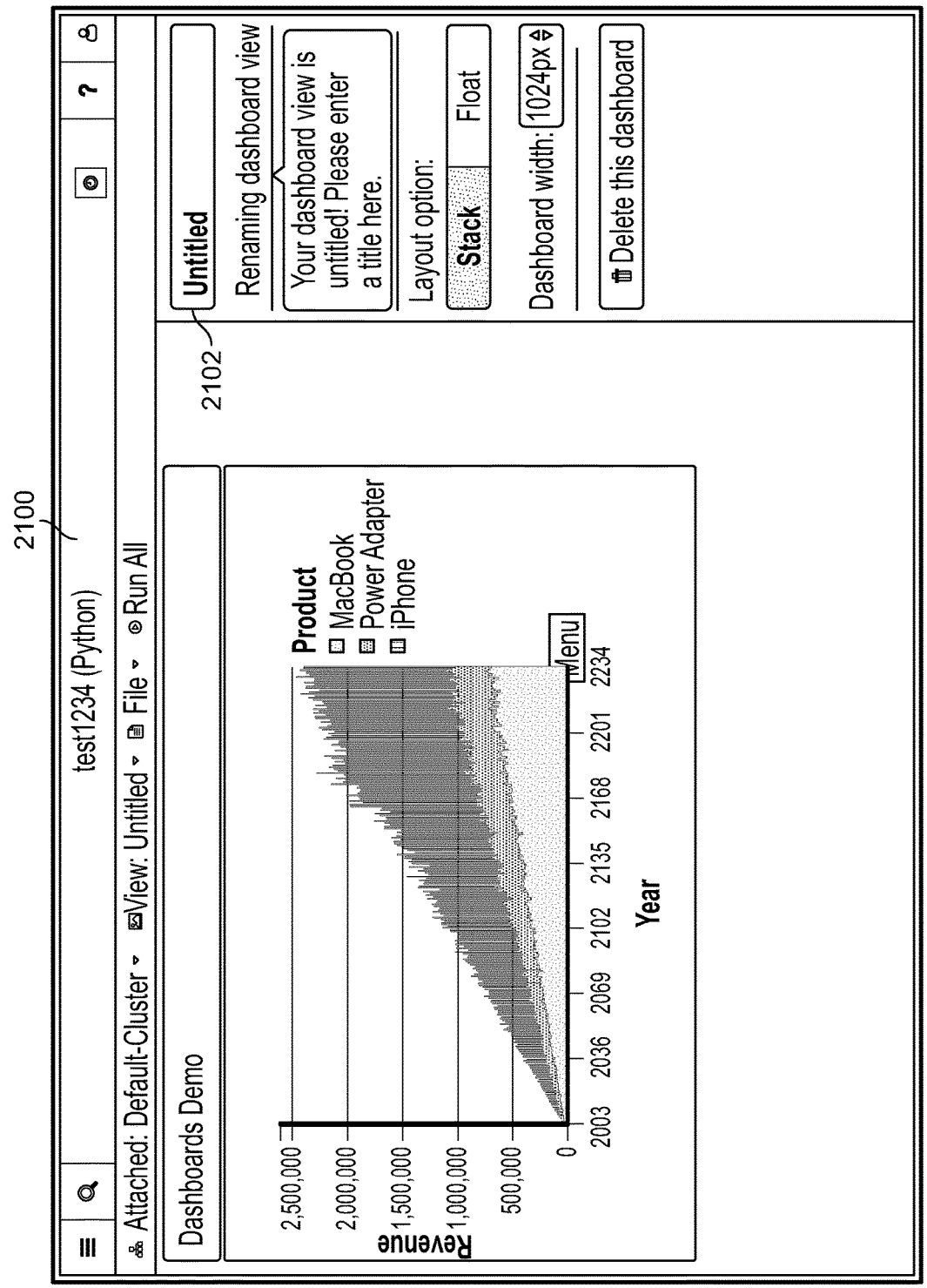
FIG. 21 is a diagram illustrating an embodiment of a dashboard view during a dashboard creation process.

FIG. 21 is a diagram illustrating an embodiment of a dashboard view during a dashboard creation process. In some embodiments, dashboard view 2100 comprises a dashboard view created as a result of an indication to a New Dashboard selection (e.g., the selection of New Dashboard selection 2002 of FIG. 20). In the example shown, dashboard view 2100 comprises title entry text box 2102.

Figure 22:
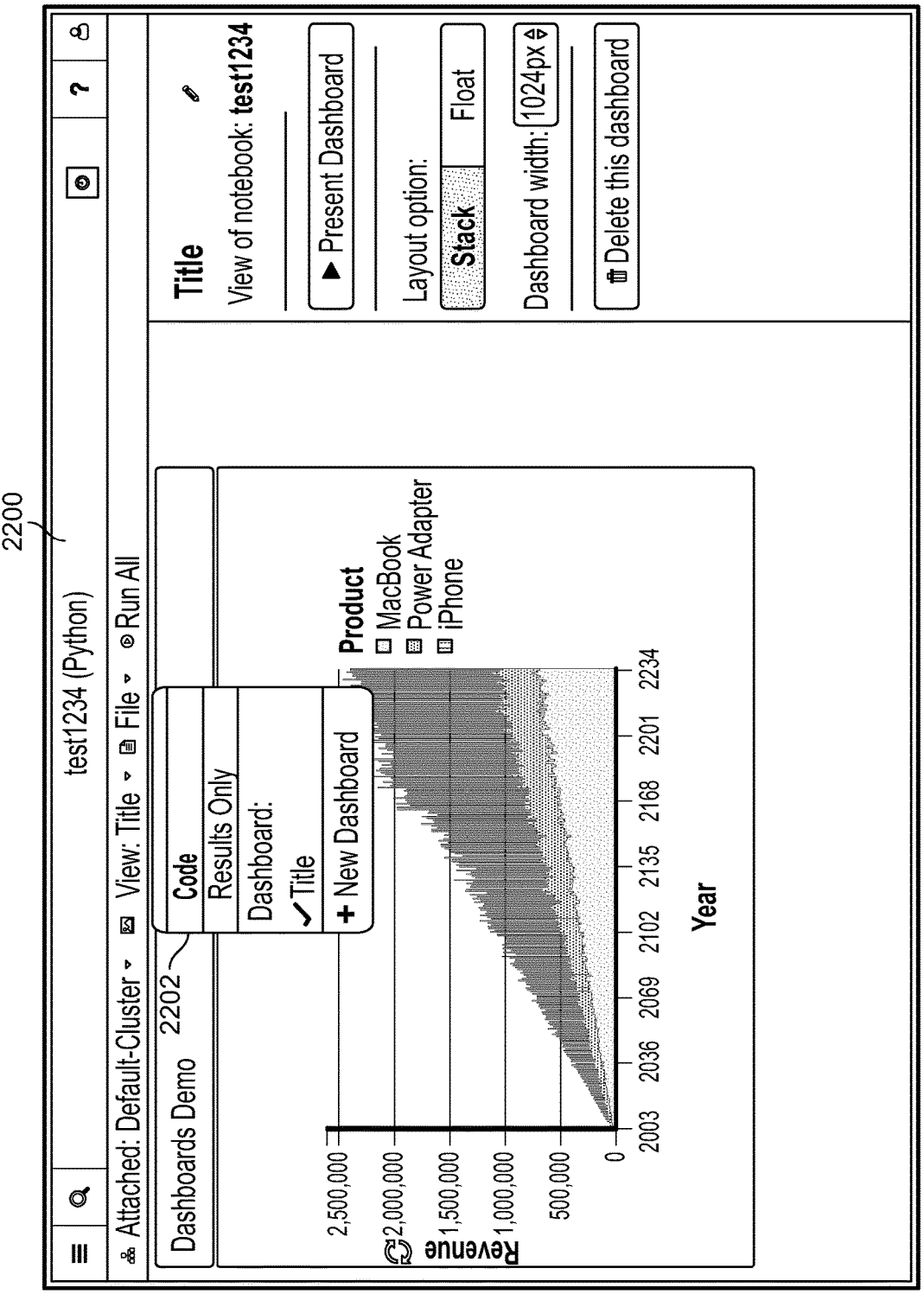
FIG. 22 is a diagram illustrating an embodiment of a dashboard view including a code view selection.

FIG. 22 is a diagram illustrating an embodiment of a dashboard view including a code view selection. In some embodiments, dashboard view 2200 comprises dashboard view 2100 of FIG. 21 including an indication to a code view selection. In the example shown, code view selection 2202 is selected. In some embodiments, in the event that code view 2202 is selected, a view comprising notebook code is displayed. In some embodiments, a view comprising notebook code comprises a notebook view.

Figure 23:
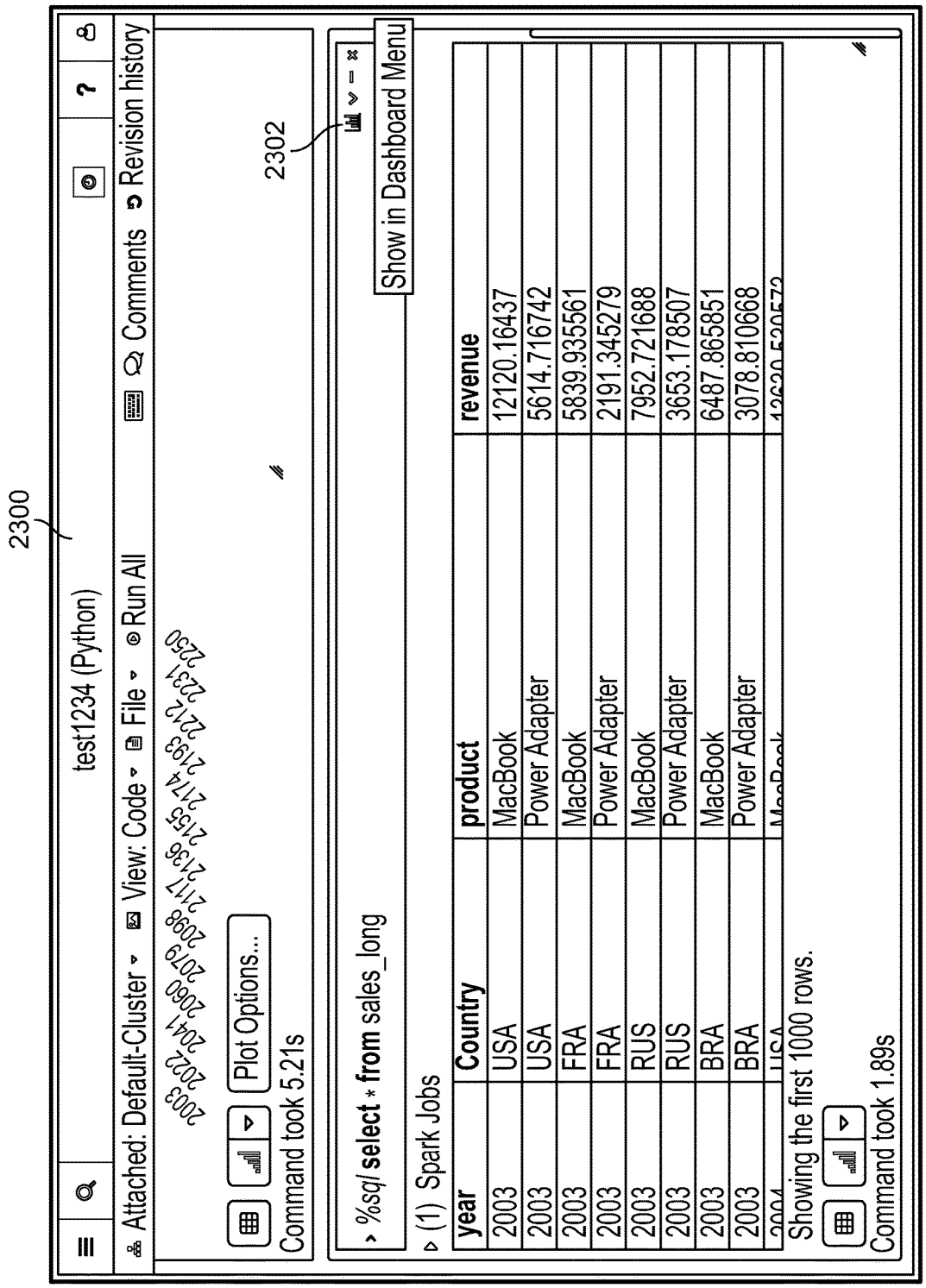
FIG. 23 is a diagram illustrating an embodiment of a notebook view including a show in dashboard menu button.

FIG. 23 is a diagram illustrating an embodiment of a notebook view including a show in dashboard menu button. In some embodiments, notebook view 2300 comprises notebook view 1900 of FIG. 19 including an indication to a show in dashboard menu button. In the example shown, notebook view 2300 comprises show in dashboard menu button 2302. In some embodiments, in the event a user makes an indication to show in dashboard menu button 2302, a show in dashboard menu is displayed. In some embodiments, a show in dashboard menu comprises a set of options for adding the associated code section to a dashboard. In some embodiments, each code section of the set of code sections comprising the notebook comprises a show in dashboard menu button.

Figure 24:
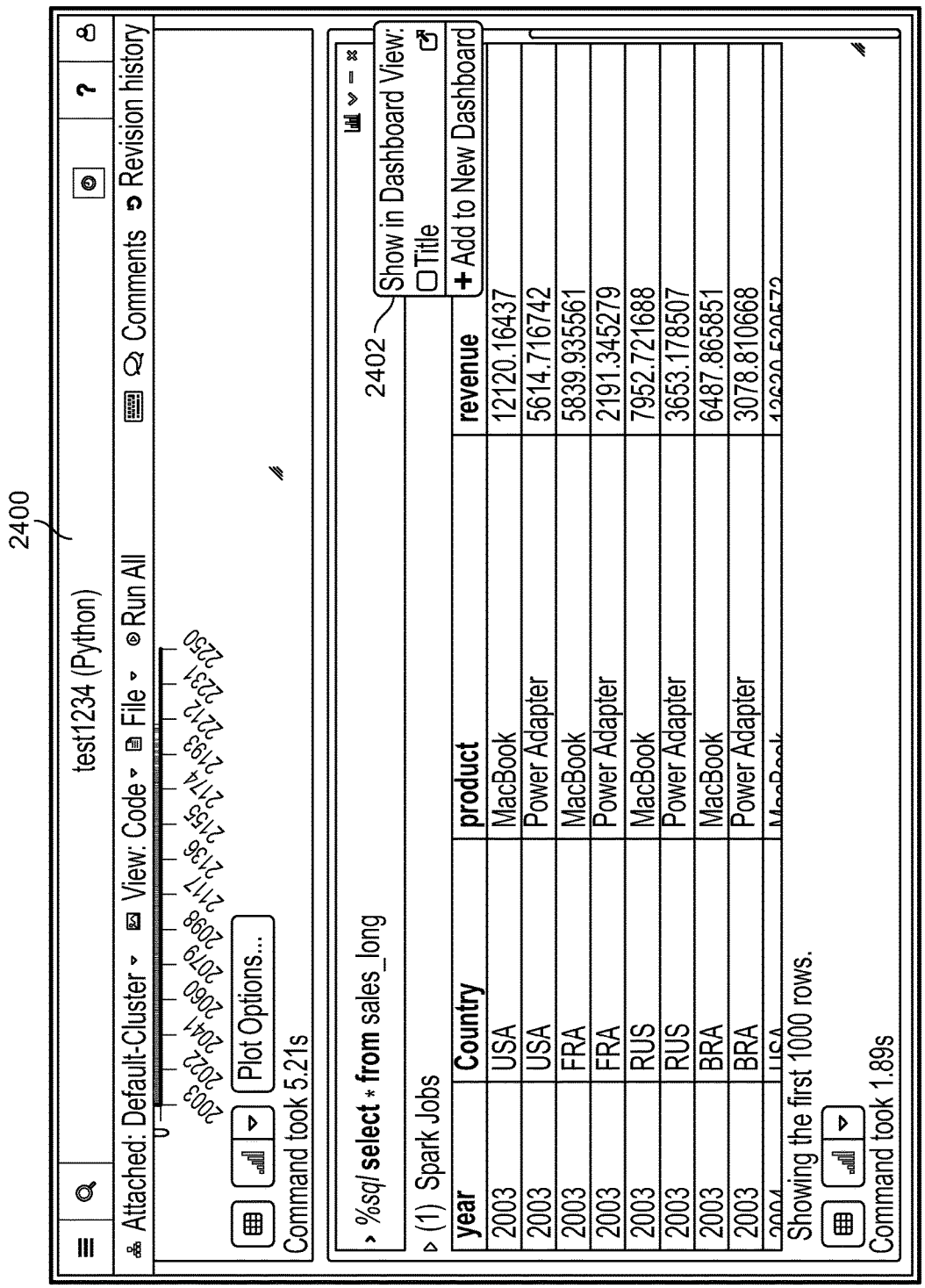
FIG. 24 is a diagram illustrating an embodiment of a notebook view including a show in dashboard menu.

FIG. 24 is a diagram illustrating an embodiment of a notebook view including a show in dashboard menu. In some embodiments, notebook view 2400 comprises notebook view 2300 of FIG. 23 in the event a user made an indication to a show in dashboard menu button. In the example shown, notebook view 2400 comprises show in dashboard menu 2402. Show in dashboard menu 2402 comprises a button for adding the associated code section output to an existing dashboard view and a button for adding the associated code section to a new dashboard view.

Figure 25:
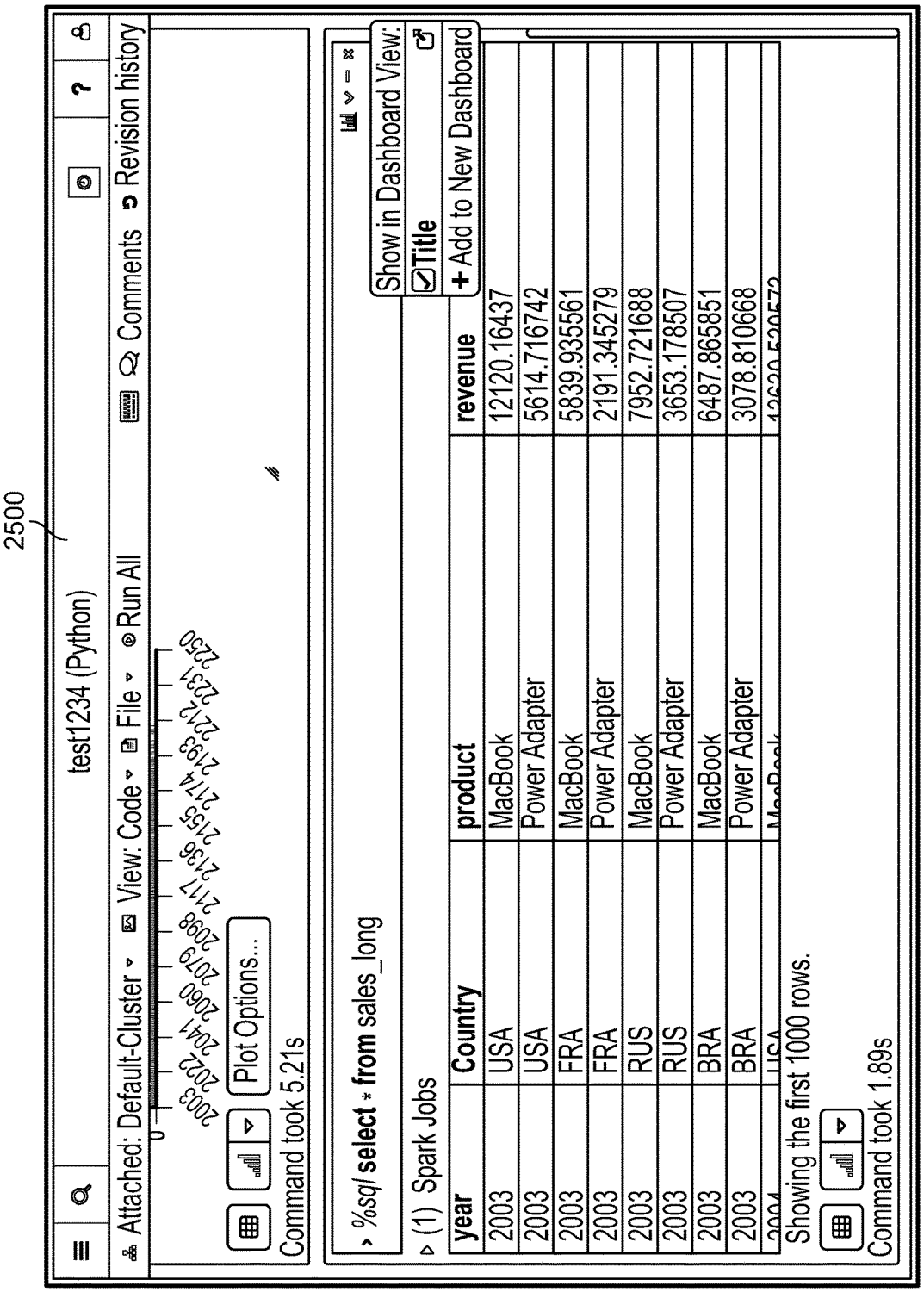
FIG. 25 is a diagram illustrating an embodiment of a notebook view including a selection to a show in dashboard menu.

FIG. 25 is a diagram illustrating an embodiment of a notebook view including a selection to a show in dashboard menu. In some embodiments, notebook view 2500 comprises notebook view 2400 of FIG. 24 in the event an indication has been made to an element of a show in dashboard menu. In the example shown, an indication has been made to add the associated code section to the dashboard view titled Title.

Figure 26:
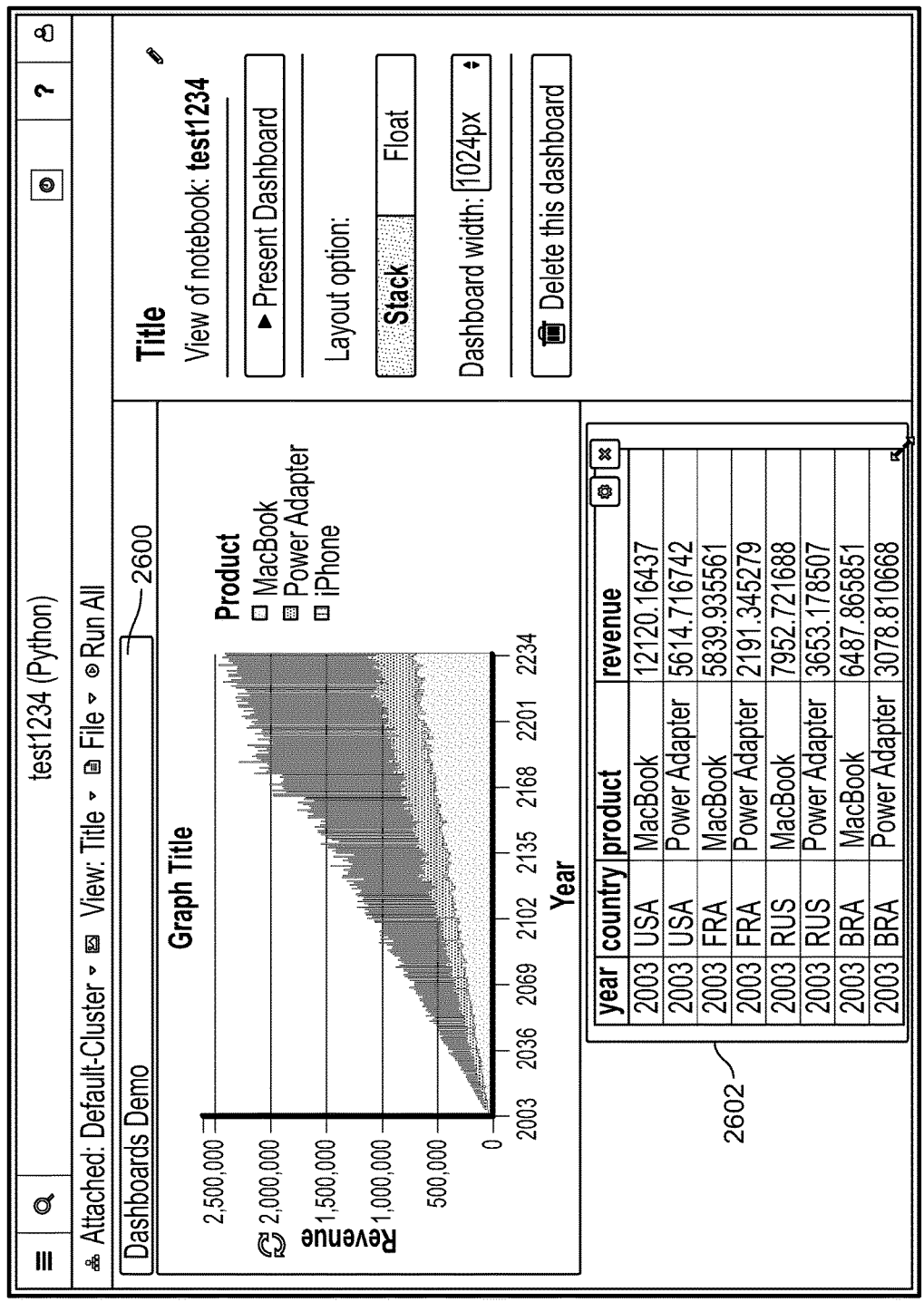
FIG. 26 is a diagram illustrating an embodiment of a dashboard view.

FIG. 26 is a diagram illustrating an embodiment of a dashboard view. In some embodiments, dashboard view 2600 comprises dashboard view 2200 of FIG. 22 with an additional code section (e.g., an additional output associated with a code section) added. In some embodiments, code section 2602 is added to dashboard view 2600 as a result of an indication to a show in dashboard menu.

Figure 27A:
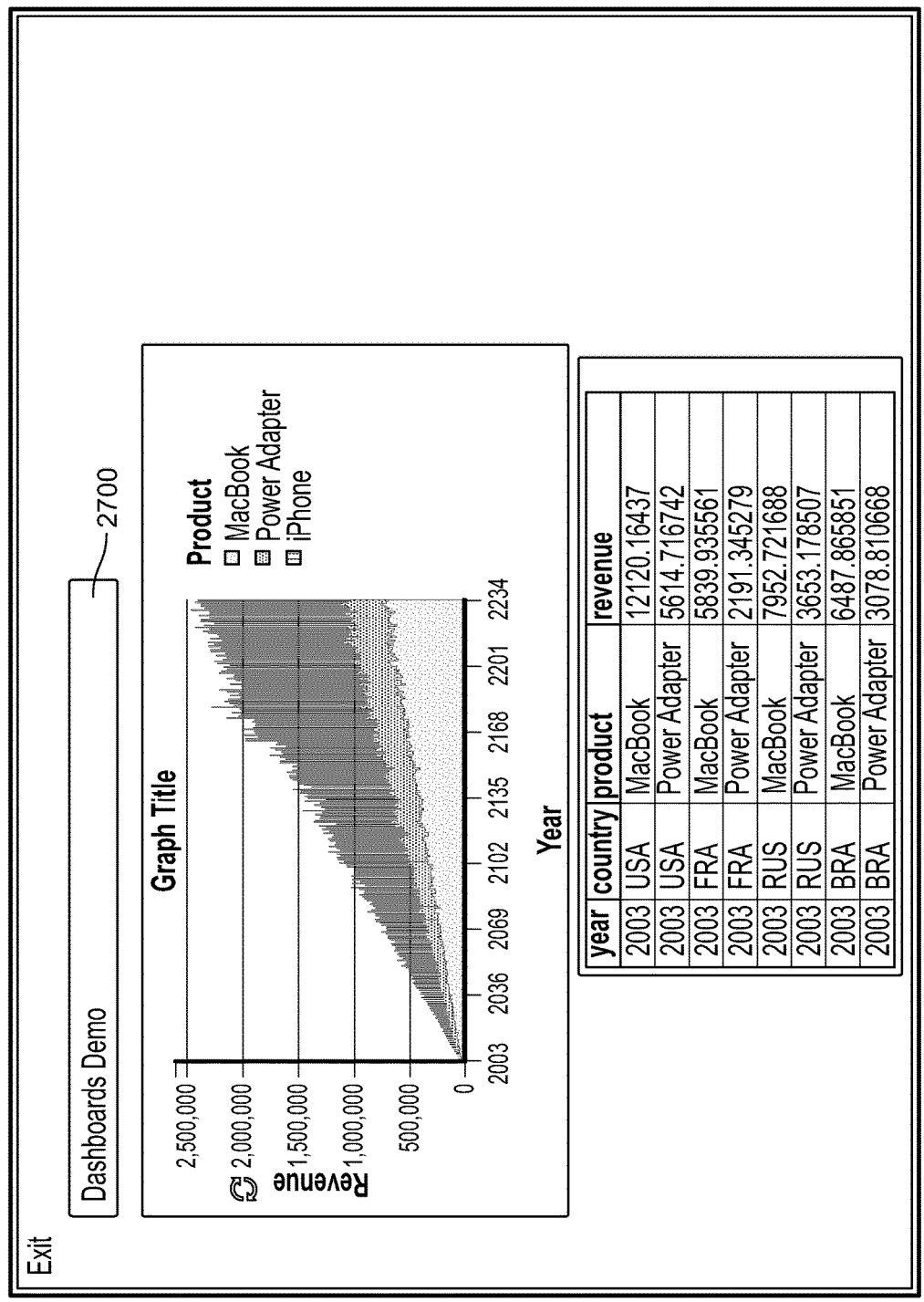
FIG. 27A is a diagram illustrating an embodiment of a presentation view.

FIG. 27A is a diagram illustrating an embodiment of a presentation view. In some embodiments, presentation view 2700 comprises a presentation view associated with dashboard view 2600 of FIG. 26. In some embodiments, a series of page views is shown similar to a slide show, where the page views are pages developed using the dashboard view(s). In some embodiments, pages are setup by the user selecting a page ratio in the edit dashboard view. In some embodiments, there is a button to toggle using pages or not using pages. In some embodiments, one page of a dashboard is shown at a time, and the user can cycle through the pages.

Figure 27B:
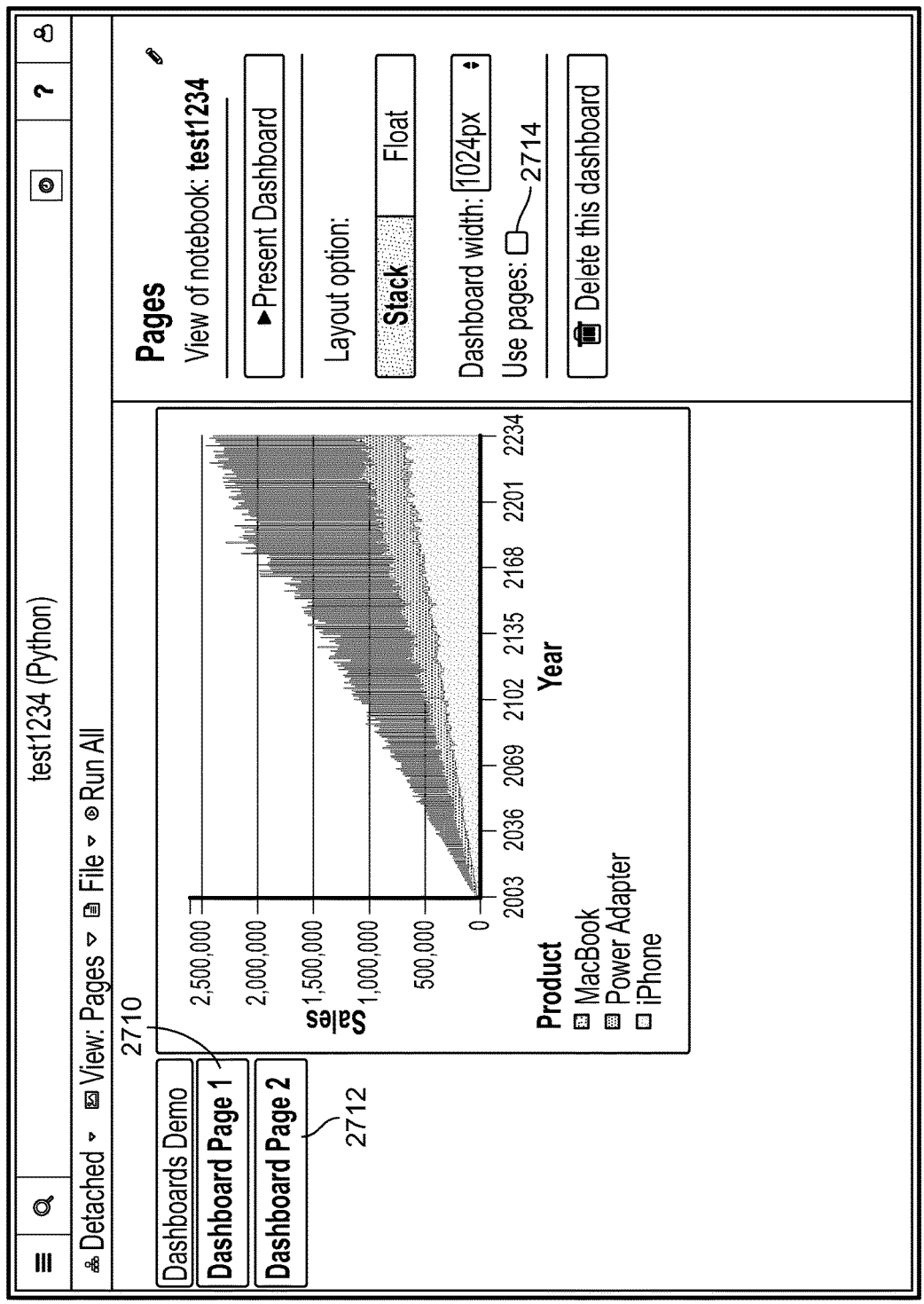
FIG. 27B is diagram illustrating an embodiment of a dashboard view.

FIG. 27B is diagram illustrating an embodiment of a dashboard view. In some embodiments, dashboard view in FIG. 27B comprises a dashboard view associated with dashboard view 2600 of FIG. 26. In the example shown, a dashboard edit view is shown with pages disabled. Page indication 2710 indicates a dashboard page 1 has been established. Page indication 2712 indicates a dashboard page 2 has been established. Box 2714 is a box that when checked by a user enables a user to indicate to enable pages or disable pages (e.g., use/turn on ages or not use/turn off pages within the dashboard view).

Figure 27C:
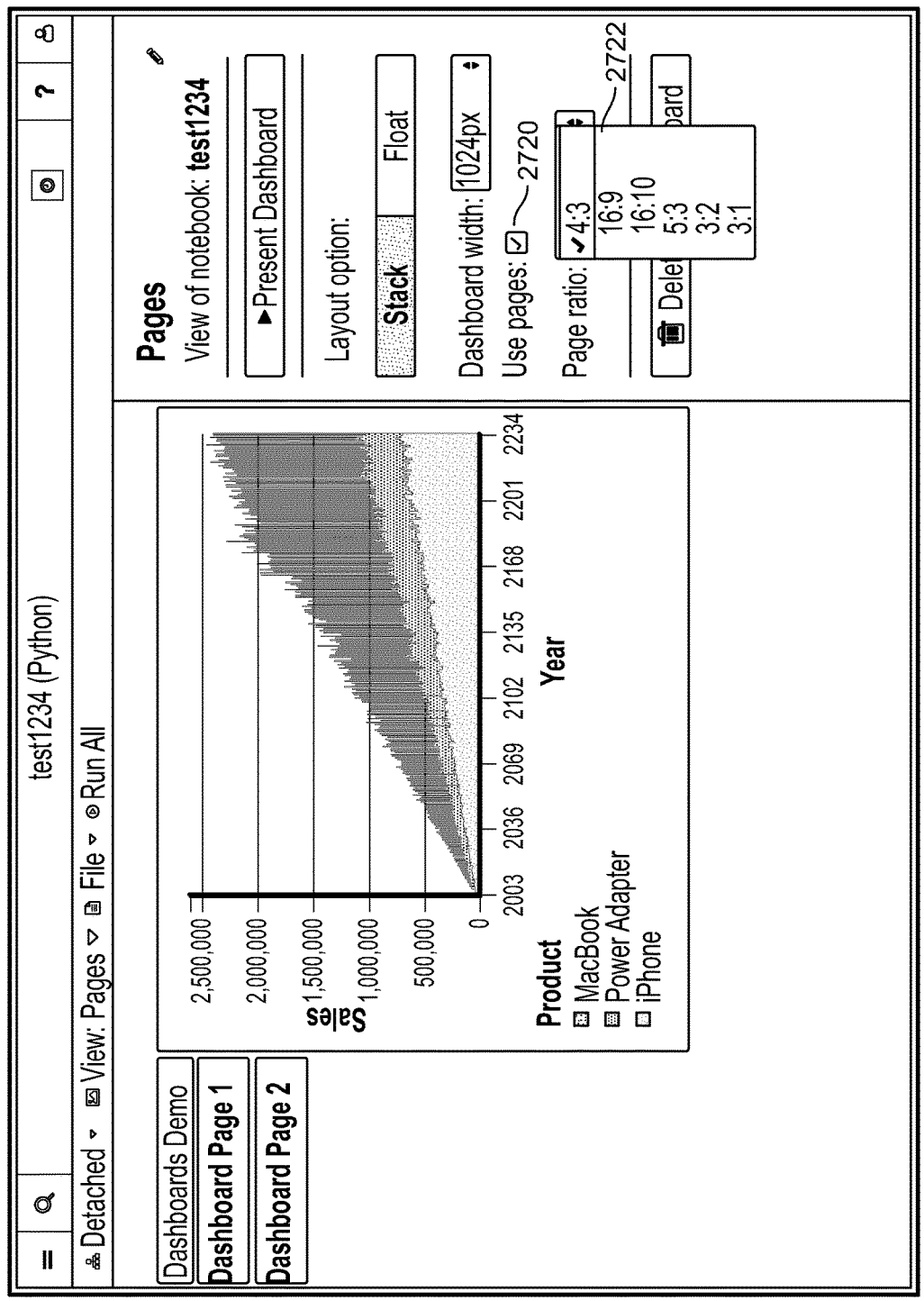
FIG. 27C is diagram illustrating an embodiment of a dashboard view.

FIG. 27C is diagram illustrating an embodiment of a dashboard view. In some embodiments, dashboard view in FIG. 27C comprises a dashboard view associated with dashboard view 2600 of FIG. 26. In the example shown, a dashboard edit view is shown with pages enabled—for example, box 2720 is checked. Page size pull down 2722 is shown expanded enabling a user to select different page sizes or width to height ratios (e.g., 4:3 ratio, 16:10 ratio, 5:3 ratio, 3:2 ratio, 3:1 ratio, etc.).

Figure 27D:
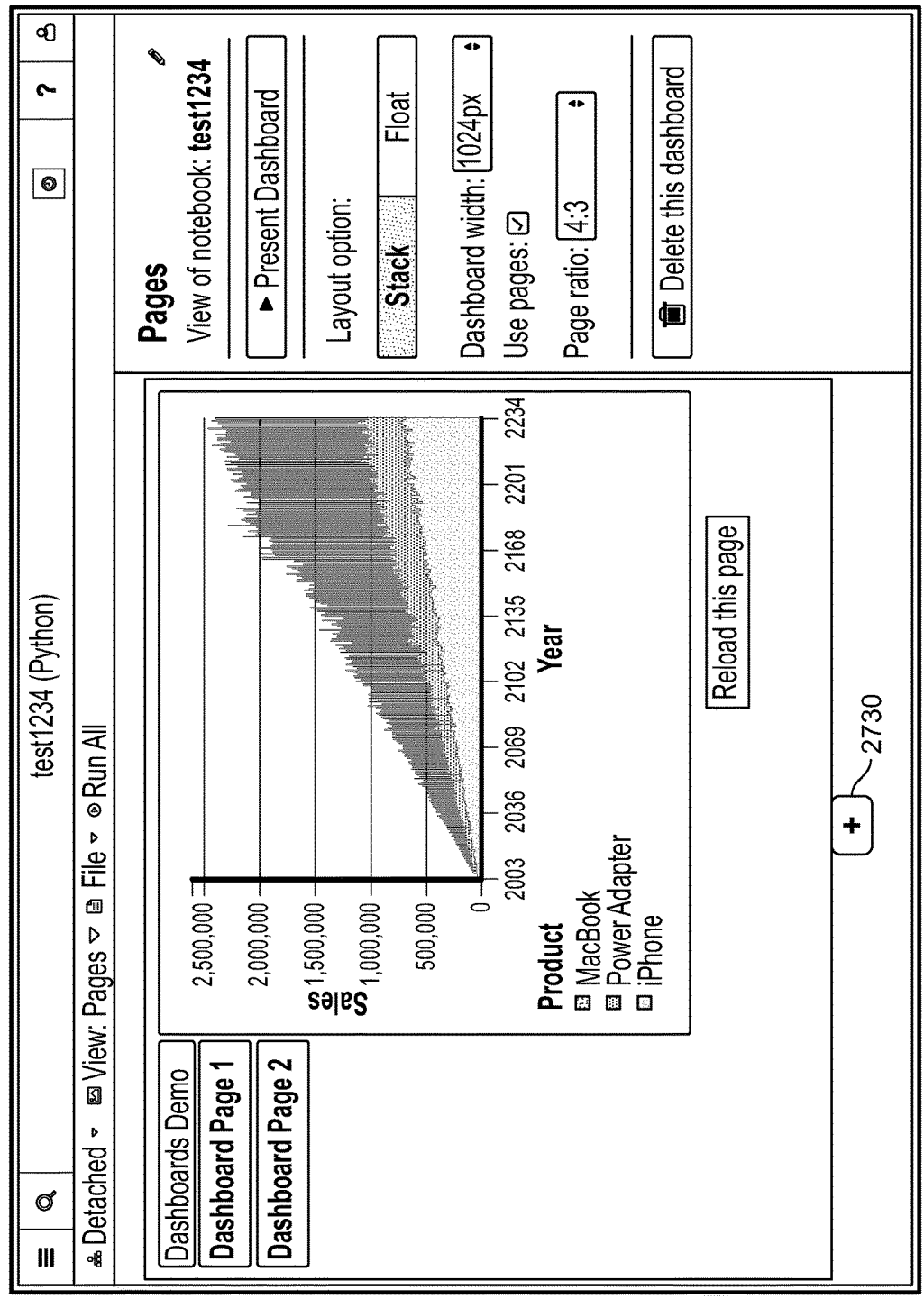
FIG. 27D is diagram illustrating an embodiment of a dashboard view.

FIG. 27D is diagram illustrating an embodiment of a dashboard view. In some embodiments, dashboard view in FIG. 27D comprises a dashboard view associated with dashboard view 2600 of FIG. 26. In the example shown, a dashboard edit view is shown with pages enabled (e.g., use pages box is checked). Add new page button 2730 (e.g., '+' button) is visible enabling a user to add an additional page for dashboard view.

Figure 27E:
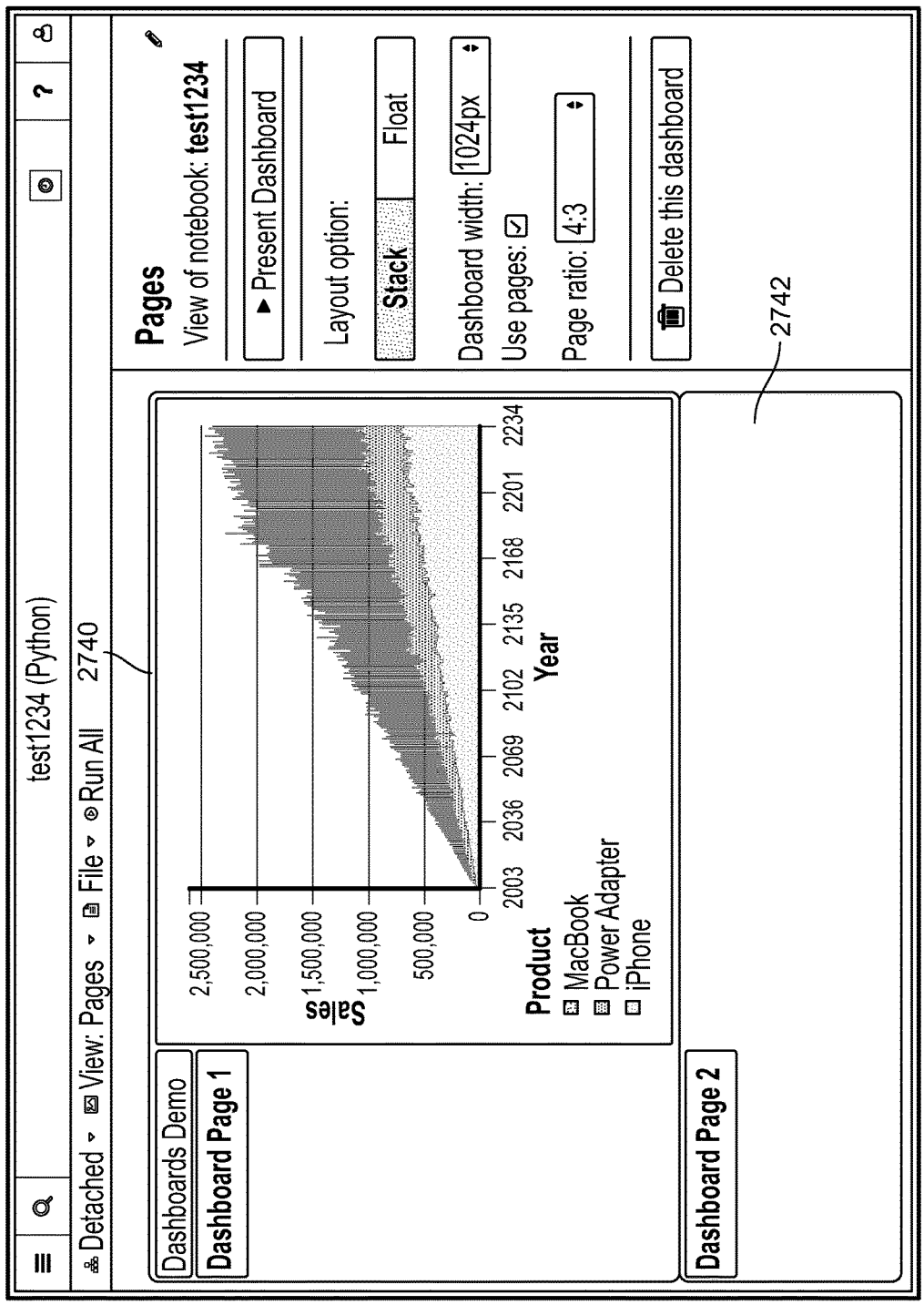
FIG. 27E is diagram illustrating an embodiment of a dashboard view.

FIG. 27E is diagram illustrating an embodiment of a dashboard view. In some embodiments, dashboard view in FIG. 27E comprises a dashboard view associated with dashboard view 2600 of FIG. 26. In the example shown, a dashboard edit view is shown with pages enabled (e.g., use pages box is checked). Page 2740 and page 2742 are shown expanded on one page for editing.

Figure 27F:
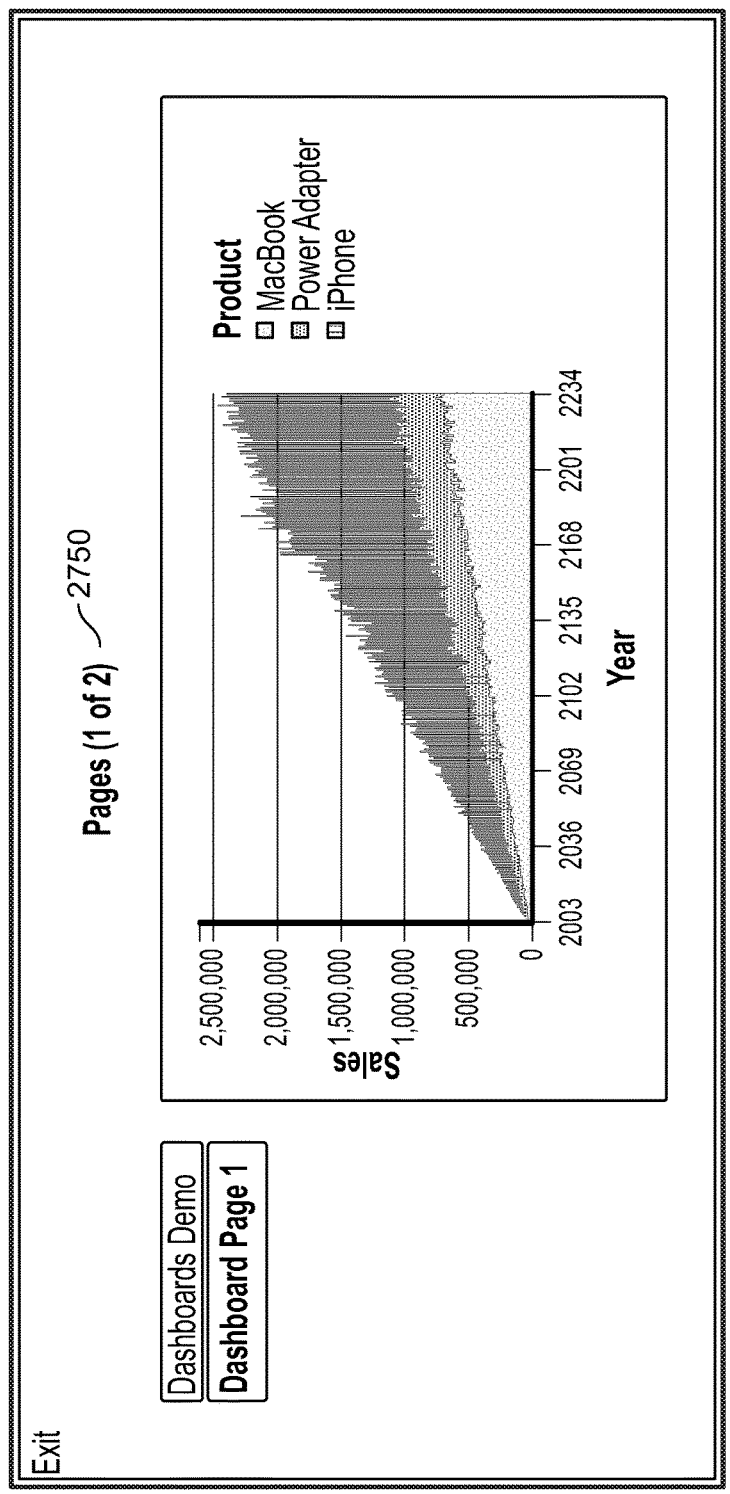
FIG. 27F is diagram illustrating an embodiment of a presentation view.

FIG. 27F is diagram illustrating an embodiment of a presentation view. In some embodiments, presentation view in FIG. 27F comprises a presentation view associated with dashboard view 2600 of FIG. 26. In the example shown, a presentation view is shown for dashboard page 1 of 2 associated with a 2 page presentation.

Figure 27G:
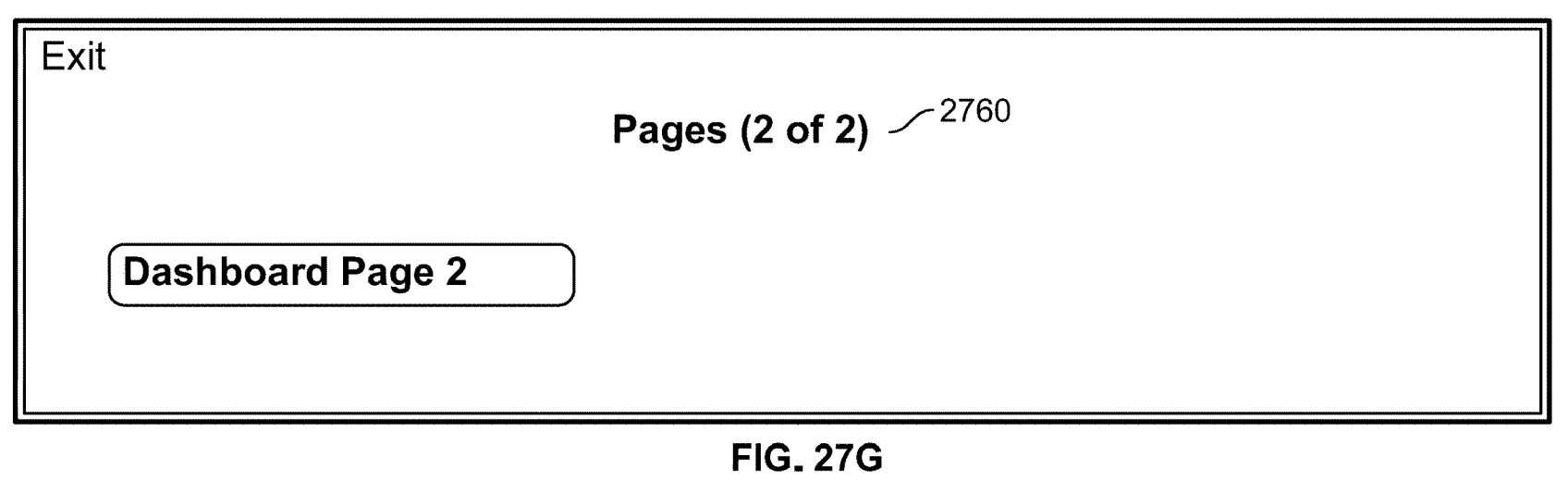

FIG. 27G is diagram illustrating an embodiment of a presentation view. In some embodiments, presentation view in FIG. 27G comprises a presentation view associated with dashboard view 2600 of FIG. 26. In the example shown, a presentation view is shown for dashboard page 2 of 2 associated with a 2 page presentation.

Figure 28:
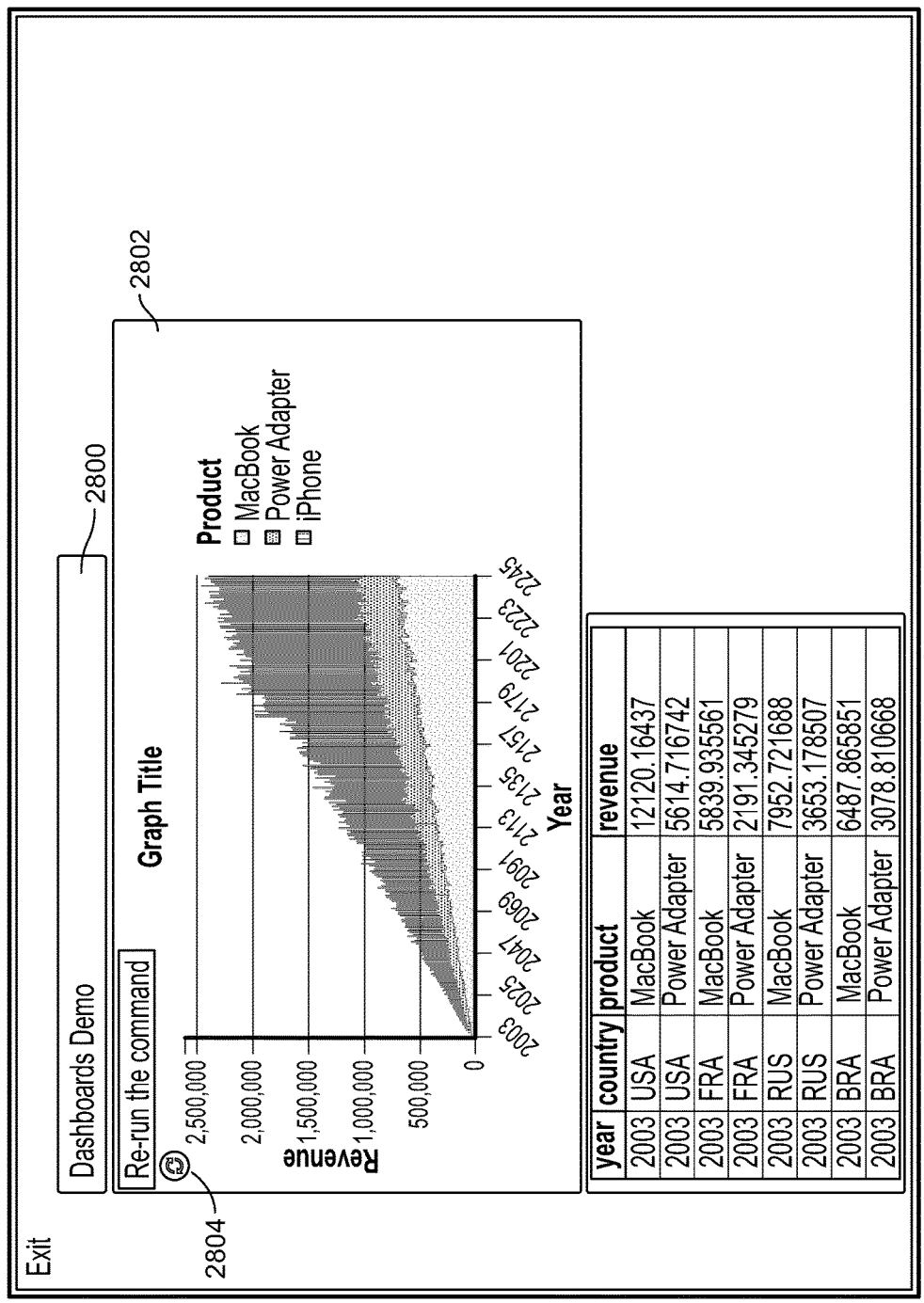
FIG. 28 is a diagram illustrating an embodiment of a presentation view including a run button.

FIG. 28 is a diagram illustrating an embodiment of a presentation view including a run button. In some embodiments, presentation view 2800 comprises presentation view 2700 of FIG. 27 including an indication to run button 2804. In some embodiments, in the event an indication to run button 2804 is received, a code section associated with output element 2802 is run.

Figure 29:
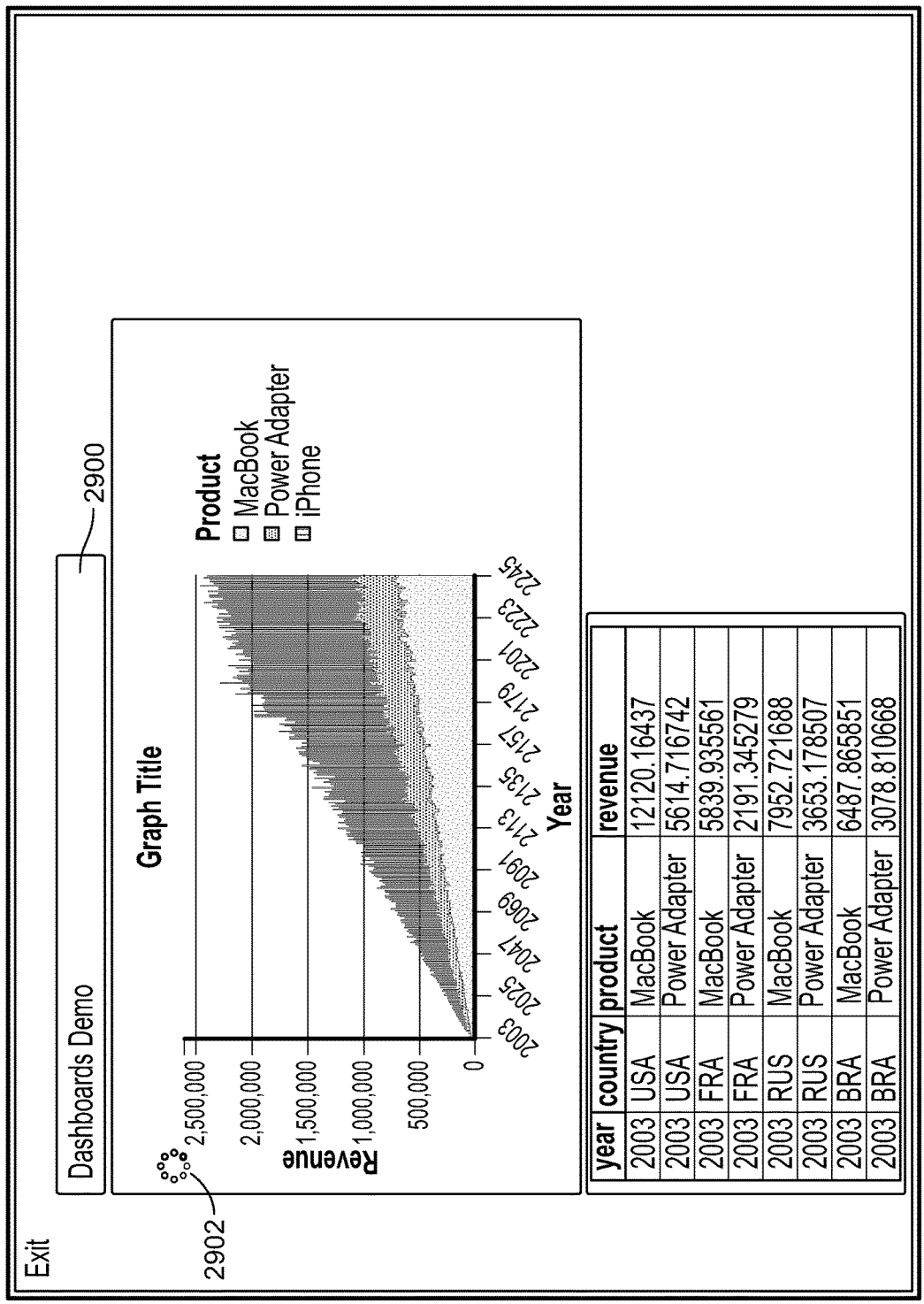
FIG. 29 is a diagram illustrating an embodiment of a presentation view including a working indicator.

FIG. 29 is a diagram illustrating an embodiment of a presentation view including a working indicator. In some embodiments, presentation view 2900 comprises presentation view 2800 of FIG. 28 after an indication to a run button. In some embodiments, working indicator 2902 indicates code is being run.

Figure 30:
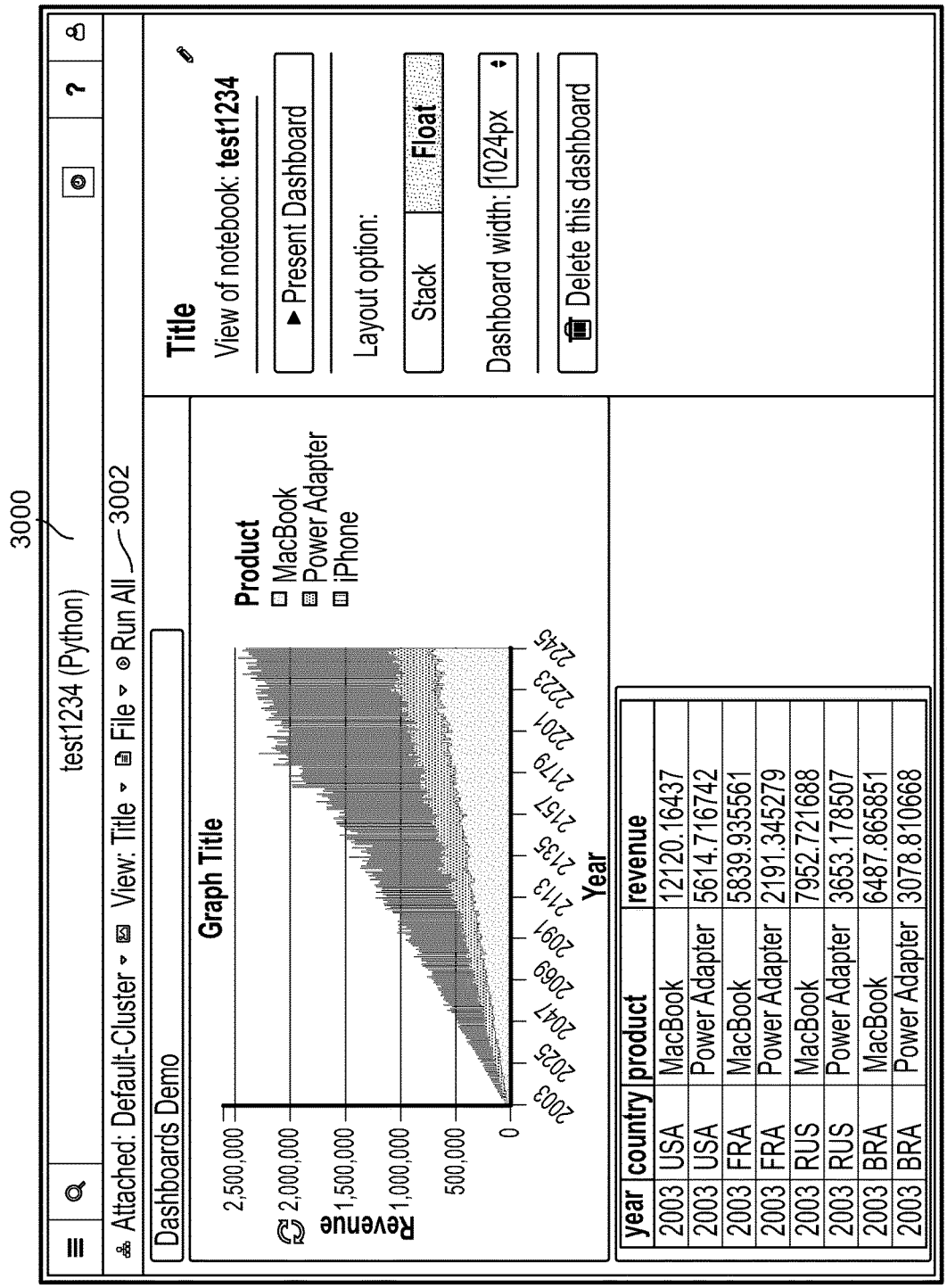
FIG. 30 is a diagram illustrating an embodiment of a dashboard view including a run all button.

FIG. 30 is a diagram illustrating an embodiment of a dashboard view including a run all button. In some embodiments, dashboard view 3000 comprises dashboard view 2600 of FIG. 26 including run all button 3002. In some embodiments, in the event an indication to run all button 3002 is received, all code sections associated with output elements shown in presentation view 3000 are run.

Figure 31:
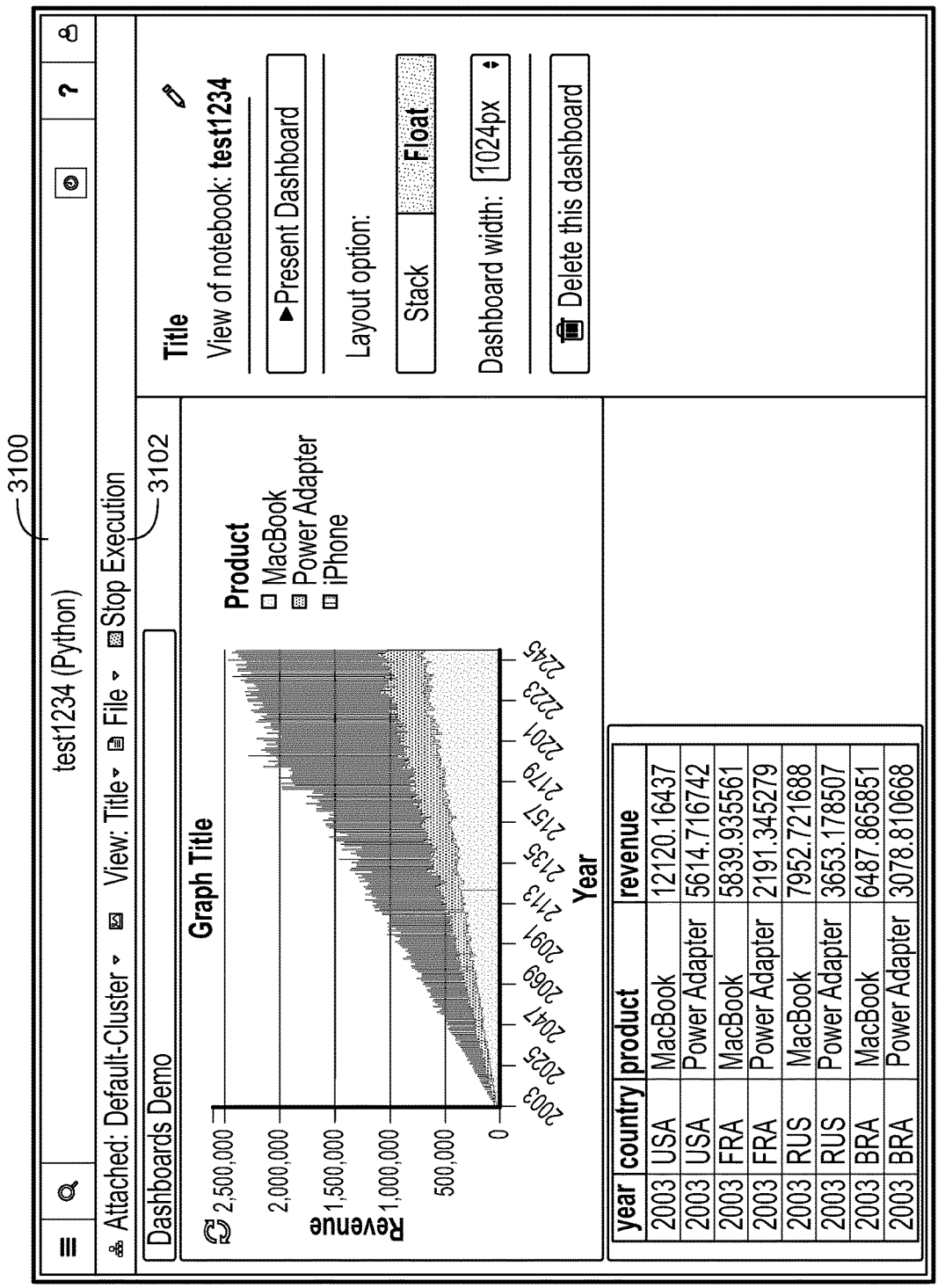
FIG. 31 is a diagram illustrating an embodiment of a dashboard view including a stop execution button.

FIG. 31 is a diagram illustrating an embodiment of a dashboard view including a stop execution button. In some embodiments, dashboard view 3100 comprises dashboard view 3000 of FIG. 30 after an indication has been made to a run all button. In some embodiments, after an indication has been made to a run all button, all code sections associated with output elements shown in the dashboard view are run. In some embodiments, while code sections associated with output elements shown in the dashboard view are run, stop execution button 3102 is shown. In some embodiments, in the event an indication to stop execution button 3102 is received, execution of code sections is stopped.

FIG. 32 is a diagram illustrating an embodiment of a code section comprising an input element. In some embodiments, code section 3200 comprises an input element associated with a code section of a notebook. In some embodiments, in the event an input is received by the input element of code section 3200, the input is processed by code section 3200. In some embodiments, code section 3200 displays the output associated with processing the received input. In various embodiments, code section 3200 is displayed by a notebook view, by a dashboard view, by a presentation view, or by any other appropriate view.

Figure 33:
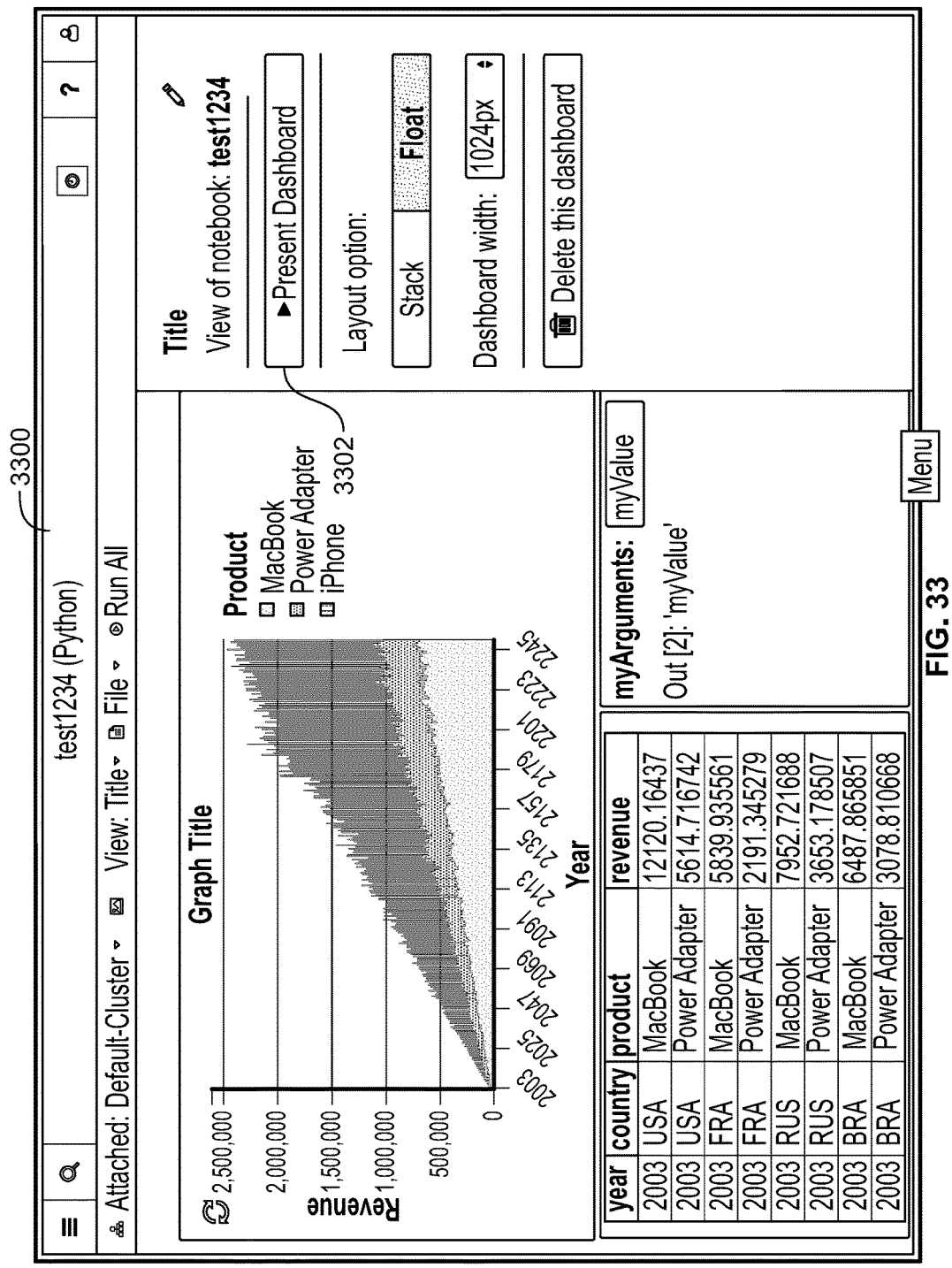
FIG. 33 is a diagram illustrating an embodiment of a dashboard view including a present dashboard button.

FIG. 33 is a diagram illustrating an embodiment of a dashboard view including a present dashboard button. In some embodiments, dashboard view 3300 comprises dashboard view 2600 of FIG. 26 including present dashboard button 3302. In some embodiments, in the event an indication to present dashboard button 3302 is received, a presentation view associated with dashboard view 3300 is displayed.

Figure 34:
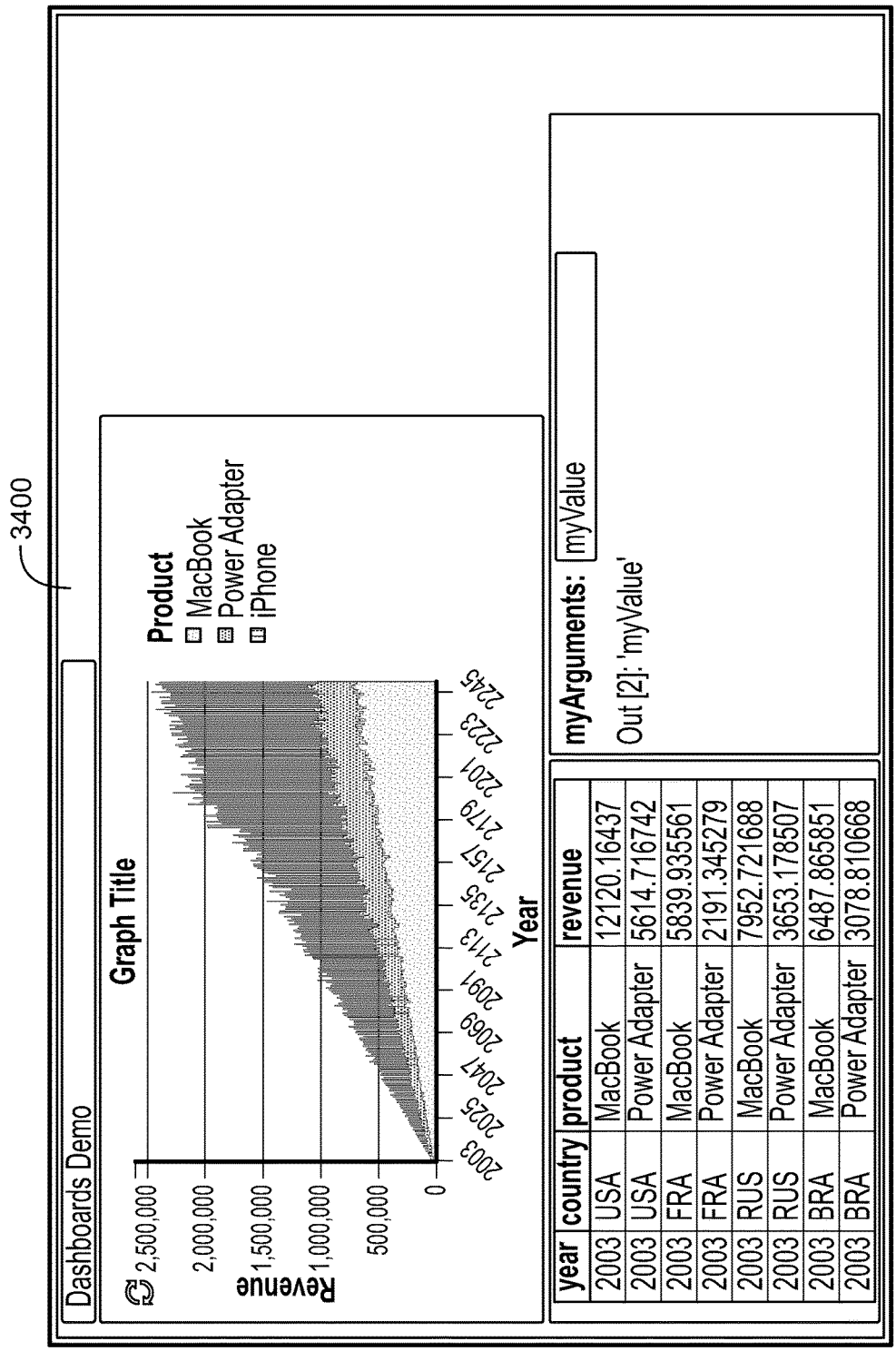
FIG. 34 is a diagram illustrating an embodiment of a presentation view.

FIG. 34 is a diagram illustrating an embodiment of a presentation view. In some embodiments, presentation view 3400 comprises a presentation view associated with dashboard 3300 of FIG. 33. In some embodiments, presentation view 3400 is displayed in response to an indication to a present dashboard button.

Figure 35:
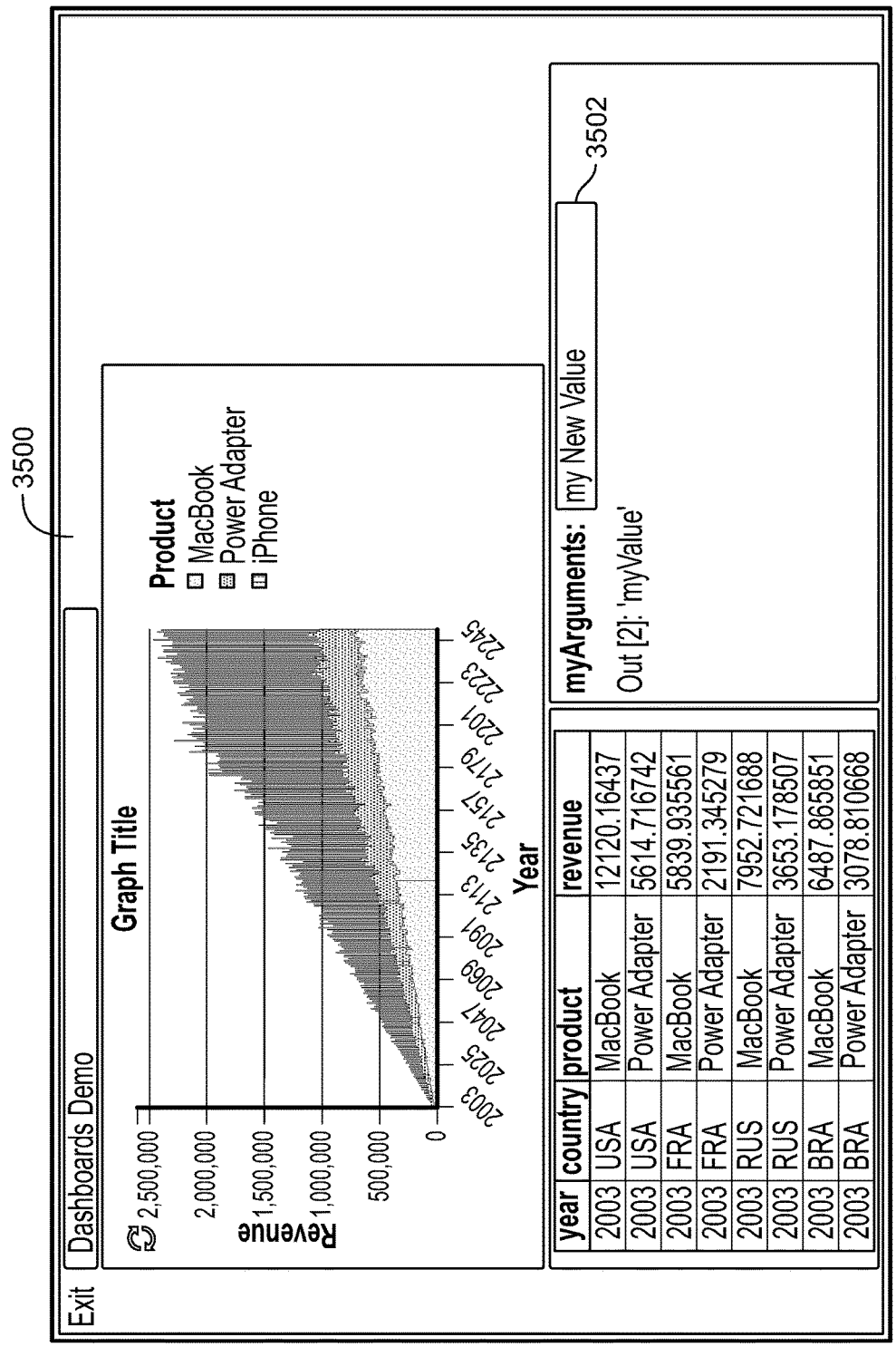
FIG. 35 is a diagram illustrating an embodiment of a presentation view including a modified input to a code section including an input object.

FIG. 35 is a diagram illustrating an embodiment of a presentation view including a modified input to a code section including an input object. In some embodiments, presentation view 3500 comprises presentation view 3400 of FIG. 34 after an input has been made to code section 3502. In the example shown, the input has been input but not entered (e.g., "my New Value" has been typed into the text entry box but the return key has not yet been pressed).

Figure 36:
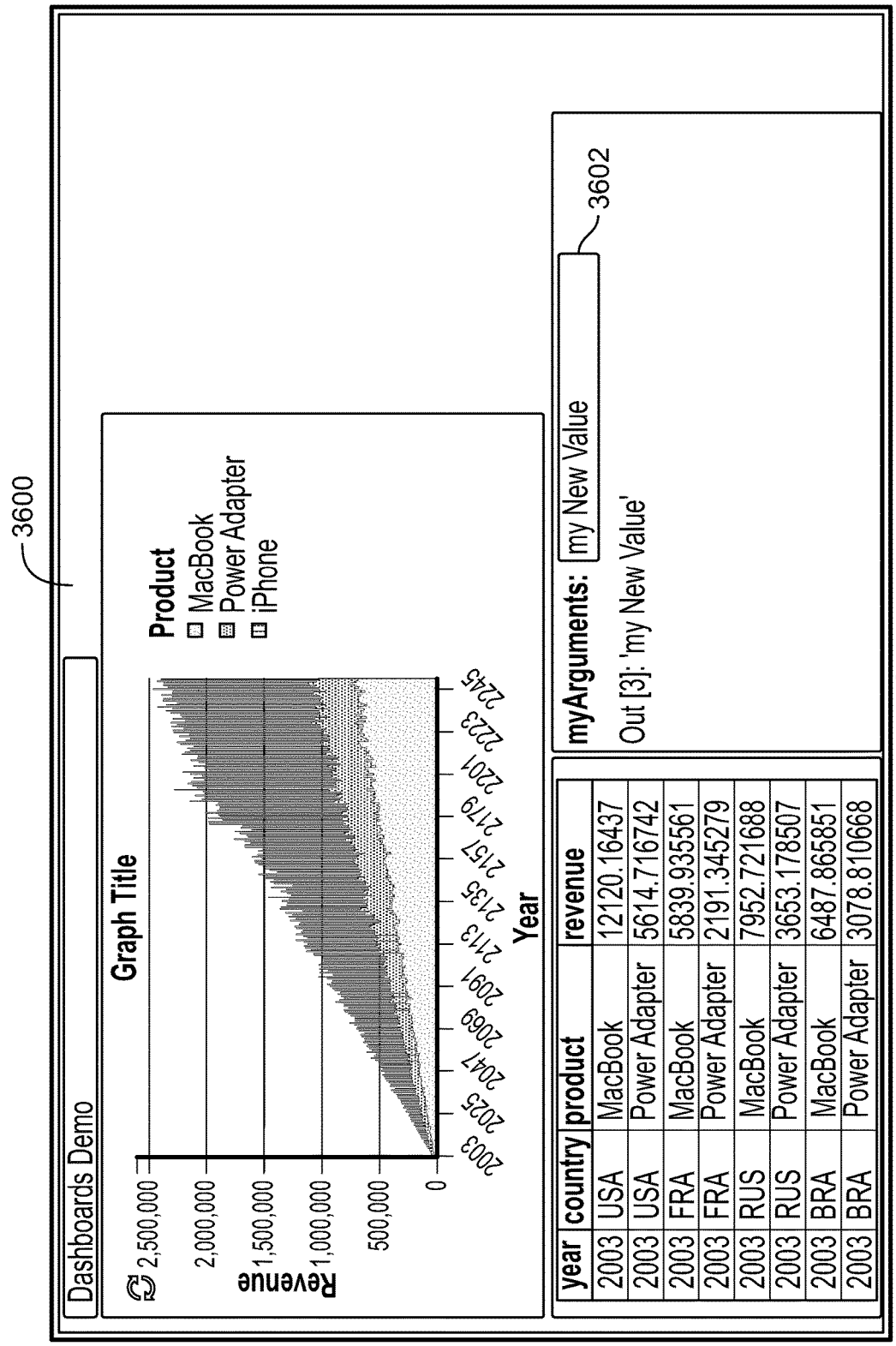
FIG. 36 is a diagram illustrating an embodiment of a presentation view including a modified output associated with a modified input.

FIG. 36 is a diagram illustrating an embodiment of a presentation view including a modified output associated with a modified input. In some embodiments, presentation view 3600 comprises presentation view 3500 of FIG. 35 after an input to a code section has been entered. In the example shown, code section 3602 displays the result of entering an input.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for multiple views for a notebook, comprising:
an input interface to receive a notebook, wherein the notebook comprises a sequential interactive code file comprising a set of code sections;
a processor to:
load the notebook into a shell, wherein the shell executes the notebook using a cluster;
receive an indication to view a dashboard associated with the notebook;
in response to receiving the indication to view the dashboard, provide dashboard display information, wherein the dashboard comprises a page layout display comprising a first output element, a second output element, a run button within the first output element, and a run all button, wherein the first output element displays a first output associated with executing a first code section of the set of code sections, wherein the second output element displays a second output associated with executing a second code section of the set of code sections, wherein the first output element comprises a graph or a table, and wherein the second output element comprises a graph or a table;
receive a run button event or a run all button event;
in response to receiving the run button event:
execute the first code section of the set of code sections without executing the second code section of the set of code sections to generate an updated first output element; and
display the updated first output element after executing the first code section of the set of code sections; and
in response to receiving the run all button event:
execute the first code section of the set of code sections and the second code section of the set of code sections to generate a second updated first output element and the updated second output element; and
display the second updated first output element and the updated second output element after executing the first code section and the second code section.

2. The system of claim 1, wherein one or more of the set of code sections produces a display output.

3. The system of claim 1, wherein the set of code sections are displayed serially within the notebook.

4. The system of claim 1, wherein the processor is further to add a third code section of the set of code sections to the set of code sections.

5. The system of claim 1, wherein the processor is further to edit a third code section of the set of code sections.

6. The system of claim 1, wherein executing the notebook using the cluster comprises converting a third code section of the set of code sections to a converted code to run on the cluster.

7. The system of claim 6, wherein executing the notebook using the cluster comprises providing the converted code to the cluster.

8. The system of claim 6, wherein executing the notebook using the cluster comprises causing the converted code to execute on the cluster.

9. The system of claim 1, wherein executing the notebook using the cluster comprises receiving execution results.

10. The system of claim 1, wherein the processor is further to receive an indication to initiate the dashboard for an output display.

11. The system of claim 10, wherein the dashboard comprises a page layout for the output display.

12. The system of claim 11, wherein the page layout for output display comprises placement of the output display elements.

13. The system of claim 11, wherein the page layout for output display comprises a sizing of the output display elements.

14. The system of claim 1, wherein the page layout display further comprises an input element, wherein the input element receives an input associated with the first code section of the set of code sections, and wherein executing the first code section of the set of code section uses the input.

15. The system of claim 1, wherein the page layout display further comprises a present dashboard button and a configuration element for configuring the output element on the dashboard, wherein the processor is further to:
   receive a present event associated with the present dashboard button; and
   in response to receiving the present event, display a presentation view, wherein the presentation view comprises the first output element and the second output element, but does not comprise the configuration element.

16. A method for multiple views for a notebook, comprising:
   receiving a notebook, wherein the notebook comprises a sequential interactive code file comprising a set of code sections;
   loading the notebook into a shell, using a processor, wherein the shell executes the notebook using a cluster;
   receiving an indication to view a dashboard associated with the notebook;
   in response to receiving the indication to view the dashboard, providing dashboard display information, wherein the dashboard comprises a page layout display comprising a first output element, a second output element, a run button within the first output element, and a run all button, wherein the first output element displays a first output associated with executing a first code section of the set of code sections, wherein the second output element displays a second output associated with executing a second code section of the set of code sections, wherein the first output element comprises a graph or a table, and wherein the second output element comprises a graph or a table;
   receiving a run button event or a run all button event;
   in response to receiving the run button event:
     executing the first code section of the set of code sections without executing a second code section of the set of code sections to generate an updated first output element; and
     displaying the updated first output element after executing the first code section of the set of code sections; and
   in response to receiving the run all button event:
     executing the first code section of the set of code sections and the second code section of the set of code sections to generate a second updated first output element and the updated second output element; and
     displaying the second updated first output element and the updated second output element after executing the first code section and the second code section.

17. A computer program product for multiple views for a notebook, the computer program product being embodied in a non-transitory computer readable storage medium and comprising computer instructions for:
   receiving a notebook, wherein the notebook comprises a sequential interactive code file comprising a set of code sections;
   loading the notebook into a shell, wherein the shell executes the notebook using a cluster;
   receiving an indication to view a dashboard associated with the notebook;
   in response to receiving the indication to view the dashboard, providing dashboard display information, wherein the dashboard comprises a page layout display comprising a first output element, a second output element, a run button within the first output element, and a run all button, wherein the first output element displays a first output associated with executing a first code section of the set of code sections, wherein the second output element displays a second output associated with executing a second code section of the set of code sections, wherein the first output element comprises a graph or a table, and wherein the second output element comprises a graph or a table;
   receiving a run button event or a run all button event;
   in response to receiving the run button event:
     executing the first code section of the set of code sections without executing a second code section of the set of code sections to generate an updated first output element; and
     displaying the updated first output element after executing the first code section of the set of code sections; and
   in response to receiving the run all button event:
     executing the first code section of the set of code sections and the second code section of the set of code sections to generate a second updated first output element and the updated second output element; and
     displaying the second updated first output element and the updated second output element after executing the first code section and the second code section.

* * * * *